(12) United States Patent
Tang et al.

(10) Patent No.: US 10,601,333 B2
(45) Date of Patent: Mar. 24, 2020

(54) FEEDFORWARD ENHANCED FEEDBACK CONTROL IN ISOLATED SWITCHED-MODE POWER CONVERTERS WITH SECONDARY-SIDE RECTIFIED VOLTAGE SENSING

(71) Applicant: Infineon Technologies Austria AG, Villach (AT)

(72) Inventors: Benjamim Tang, Rancho Palos Verdes, CA (US); Hongying Ding, Redondo Beach, CA (US); Sue Perranoski, Rancho Palos Verdes, CA (US); Richard Pierson, Newport Beach, CA (US); Darryl Tschirhart, Cambridge (CA)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/109,254

(22) Filed: Aug. 22, 2018

(65) Prior Publication Data

US 2020/0067416 A1    Feb. 27, 2020

(51) Int. Cl.
*H02M 3/335* (2006.01)
*H02M 3/337* (2006.01)
*H02M 1/00* (2006.01)

(52) U.S. Cl.
CPC ..... *H02M 3/33592* (2013.01); *H02M 3/3376* (2013.01); *H02M 3/33553* (2013.01); *H02M 2001/0022* (2013.01); *H02M 2001/0025* (2013.01)

(58) Field of Classification Search
CPC . H02M 2001/0022; H02M 2001/0025; H02M 3/33553; H02M 3/33592; H02M 3/3376
See application file for complete search history.

(56) References Cited

U.S. PATENT DOCUMENTS

| 5,862,044 | A | 1/1999 | Shioya et al. |
| 6,486,642 | B1 | 11/2002 | Qian |
| 6,674,278 | B1 | 1/2004 | Uesugi et al. |
| 9,397,578 | B2 | 7/2016 | Karlsson et al. |

(Continued)

FOREIGN PATENT DOCUMENTS

| EP | 1978625 A2 | 10/2008 |
| JP | 2015167443 A | 9/2015 |

*Primary Examiner* — Fred E Finch, III
(74) *Attorney, Agent, or Firm* — Murphy, Bilak & Homiller, PLLC

(57) ABSTRACT

An isolated switched-mode power converter converts power from an input source into power for an output load. Power switches within a primary-side power stage control the amount of power input to the power converter and, ultimately, provided to the output load. A digital controller on the secondary side of the power converter generates signals to control the power switches. This generation is based upon closed-loop (feedback) control as well as feedforward control. The feedforward control compensates for variations in the voltage of the input source. The input voltage is estimated by sensing a rectified voltage at a node between a secondary winding of the isolation transformer and an output filter. The feedforward compensation modifies the generated switch control signals based upon the sensed rectified voltage.

21 Claims, 12 Drawing Sheets

(56) References Cited

U.S. PATENT DOCUMENTS

| | | | |
|---|---|---|---|
| 9,812,971 B1 | 11/2017 | Tschirhart et al. | |
| 9,812,979 B1 * | 11/2017 | Tschirhart | H02M 3/33592 |
| 9,825,546 B2 | 11/2017 | Tang et al. | |
| 9,837,907 B1 | 12/2017 | Babazadeh et al. | |
| 9,929,663 B1 | 3/2018 | Babazadeh et al. | |
| 2004/0233685 A1 * | 11/2004 | Matsuo | H02M 3/285 363/65 |
| 2005/0226014 A1 * | 10/2005 | Chang | H02M 7/1623 363/84 |
| 2005/0286272 A1 | 12/2005 | Iwamoto et al. | |
| 2006/0139967 A1 | 6/2006 | Quitayen | |
| 2007/0247084 A1 | 10/2007 | Zhao | |
| 2008/0007977 A1 | 1/2008 | Piper et al. | |
| 2008/0055944 A1 | 3/2008 | Wang et al. | |
| 2009/0146643 A1 | 6/2009 | Ostrom et al. | |
| 2010/0109648 A1 | 5/2010 | Cheung | |
| 2010/0237843 A1 | 9/2010 | Rivet et al. | |
| 2012/0218793 A1 | 8/2012 | Springett et al. | |
| 2013/0003420 A1 * | 1/2013 | Ye | H02M 3/33515 363/17 |
| 2013/0113286 A1 | 5/2013 | Farrenkopf | |
| 2013/0169212 A1 * | 7/2013 | Sun | H02M 3/33592 320/103 |
| 2013/0308347 A1 | 11/2013 | Sato et al. | |
| 2014/0198535 A1 | 7/2014 | Yang et al. | |
| 2014/0254206 A1 * | 9/2014 | Ou | H02M 3/33592 363/21.01 |
| 2014/0376281 A1 | 12/2014 | Ohashi | |
| 2015/0070950 A1 | 3/2015 | Myhre et al. | |
| 2015/0091460 A1 | 4/2015 | Kato et al. | |
| 2015/0115911 A1 | 4/2015 | Parto et al. | |
| 2015/0115919 A1 | 4/2015 | Yang et al. | |
| 2015/0236596 A1 * | 8/2015 | Fan | H02M 3/33523 363/17 |
| 2015/0244279 A1 | 8/2015 | Takagi et al. | |
| 2015/0249391 A1 | 9/2015 | Yang et al. | |
| 2015/0268280 A1 | 9/2015 | Miljanic et al. | |
| 2015/0349573 A1 * | 12/2015 | Tschirhart | H02J 50/12 320/108 |
| 2015/0365006 A1 * | 12/2015 | Choi | H02M 3/33592 363/21.02 |
| 2016/0028313 A1 * | 1/2016 | Kong | H02M 3/33507 363/21.12 |
| 2016/0036340 A1 | 2/2016 | Kikuchi et al. | |
| 2016/0072392 A1 | 3/2016 | Soares et al. | |
| 2016/0072399 A1 | 3/2016 | Kikuchi et al. | |
| 2016/0261200 A1 | 9/2016 | Yabuzaki | |
| 2016/0352231 A1 | 12/2016 | Quigley | |
| 2017/0155335 A1 | 6/2017 | Chang et al. | |
| 2017/0163144 A1 | 6/2017 | Boncato et al. | |
| 2017/0179809 A1 | 6/2017 | Choi | |
| 2017/0307662 A1 | 10/2017 | Miljanic et al. | |
| 2017/0317595 A1 | 11/2017 | Babazadeh et al. | |
| 2017/0331386 A1 | 11/2017 | Babazadeh | |
| 2018/0062523 A1 | 3/2018 | Rainer et al. | |
| 2018/0152111 A1 * | 5/2018 | Tschirhart | H02M 1/088 |
| 2018/0175738 A1 | 6/2018 | Kikuchi | |
| 2019/0013727 A1 | 1/2019 | Ke | |
| 2019/0260282 A1 | 8/2019 | Oh et al. | |

* cited by examiner

FEEDFORWARD ENHANCED FEEDBACK CONTROL IN ISOLATED SWITCHED-MODE POWER CONVERTERS WITH SECONDARY-SIDE RECTIFIED VOLTAGE SENSING

TECHNICAL FIELD

The present application relates to isolated switched-mode power converters and, in particular, relates to techniques for responding to input voltage transients by using feedforward compensation based upon sensing a rectified voltage on the secondary side of a power converter.

BACKGROUND

Isolated switched-mode direct-current (DC) to DC power converters use a transformer to convert power from an input source into power for an output load. Such power converters include power switches that convert DC input power into alternating current (AC) power that is fed to the primary side of the transformer. AC power supplied on the secondary side of the transformer is rectified to convert it back into DC power which is filtered and provided to the output load. The primary-side power switches are typically controlled by pulse-width-modulated (PWM) control signals. A controller generates the PWM control signals with a frequency and duty cycle that are appropriate to meet the power needs of the output load.

The controller typically uses a linear closed-loop feedback technique to maintain the output voltage near a desired target. The controller may be implemented using analog or digital circuitry, and may be located on the primary or secondary side of the power converter. So as to maintain the integrity of the isolation barrier of the power converter, any signals crossing between the primary and secondary sides must pass through isolators, e.g., transformers, opto-couplers. Analog controllers are often preferably located on the primary side of the power converter, where the input voltage and/or current may be readily sensed and used to augment the closed-loop control. However, such primary-side controllers have the disadvantage that one or more analog isolators must be used to transfer the output voltage and/or current information from the secondary to the primary side for purposes of implementing the closed-loop control. Furthermore, system managers are typically located on the secondary side, meaning that communication signals from a system manager must also pass through isolators. For these reasons, as well as cost, size, and flexibility advantages, isolated switched-mode power converters increasingly use digital controllers that are located on the secondary side.

Closed-loop control provides good regulation of the output voltage for a power converter when the input provides stable power and the load current is fairly constant, or if a large output capacitor is used to maintain good transient response. As switched-mode power converters decrease in size, e.g., due to increasing switching frequencies and smaller inductors, the output capacitor is consuming a larger relative portion of the power converter size, so there is a significant trend towards reducing the output capacitor size. For a given output capacitance, the linear closed-loop control design for a power converter represents a trade-off between fast transient response and loop stability. So as to provide good stability and fast transient response while using smaller output capacitors, enhanced control techniques may be used to supplement conventional linear feedback control. Such enhanced control techniques may be used, e.g., to more quickly adjust to load transients or input voltage transients.

Feedforward control techniques may monitor the input voltage of a power converter so as to detect input voltage transients (changes) that a linear closed-loop feedback control technique might not be able to adequately track. Such detection may then be used to augment the closed-loop control so as to quickly respond to the input transient. Because such feedforward compensation typically requires tracking (measuring) the input voltage, feedforward compensation is often difficult or unfeasible to implement within a digital controller located on the secondary side of a power converter, as the input voltage is not readily available to such a controller.

Power converter control techniques that quickly compensate for input transients and that are readily implemented within a secondary-side controller are desired. These techniques should require little or no additional circuitry beyond that required for closed-loop feedback control.

SUMMARY

According to a first embodiment of a switched-mode power converter having an isolated topology, the power converter converts power from an input source into power for an output load. The power converter comprises a power stage, a transformer, a rectifier circuit, a filter circuit, and a secondary-side controller. The power stage is coupled to the input source and includes one or more power switches for controlling a power transfer through the power converter. The transformer provides isolation between primary and secondary sides of the power converter, and includes a primary winding which is coupled to the power stage and a secondary winding. The rectifier circuit is coupled to the secondary winding and is configured to provide a rectified voltage at a rectified voltage node. The filter circuit is interposed between the rectified voltage node and an output of the power converter. The filter circuit is configured to filter the rectified voltage, so as to provide a filtered voltage at the output. The secondary-side controller is configured to receive or generate a reference voltage which provides a regulation target for the output voltage. The secondary-side controller is also configured to sense the output voltage and the rectified voltage. The secondary-side controller is further configured to generate control signals for controlling the power switches, wherein the generation is based upon the reference voltage, the sensed output voltage and the sensed rectified voltage.

According to an embodiment of a method, the method is performed within an isolated switched-mode power converter for converting power from an input source into power for an output load. The power converter comprises a power stage including one or more switches, a transformer comprising a primary winding coupled to the power stage and a secondary winding, a rectifier circuit coupled to the secondary winding and configured to provide a rectified voltage at a rectified voltage node, and a filter circuit interposed between the rectified voltage node and an output of the switched-mode power converter. The method comprises a first step of receiving or generating a reference voltage which provides a regulation target for an output voltage at the output of the power converter. The method further comprises steps of sensing the output voltage and the rectified voltage. The method also includes a step of generating switch control signals for controlling the one or more power switches, wherein the generation is based upon the reference voltage, the sensed output voltage, and the sensed rectified voltage.

According to a second embodiment of a switched-mode power converter having an isolated topology, the power converter converts power from an input source into power for an output load. The power converter comprises a power stage, a transformer, a rectifier circuit, and a filter circuit as described above in the first embodiment. The power converter includes a secondary-side controller configured to sense the rectified voltage and to generate switch control signals for controlling the power switches of the power stage, based upon the sensed rectified voltage.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

Figure 1:
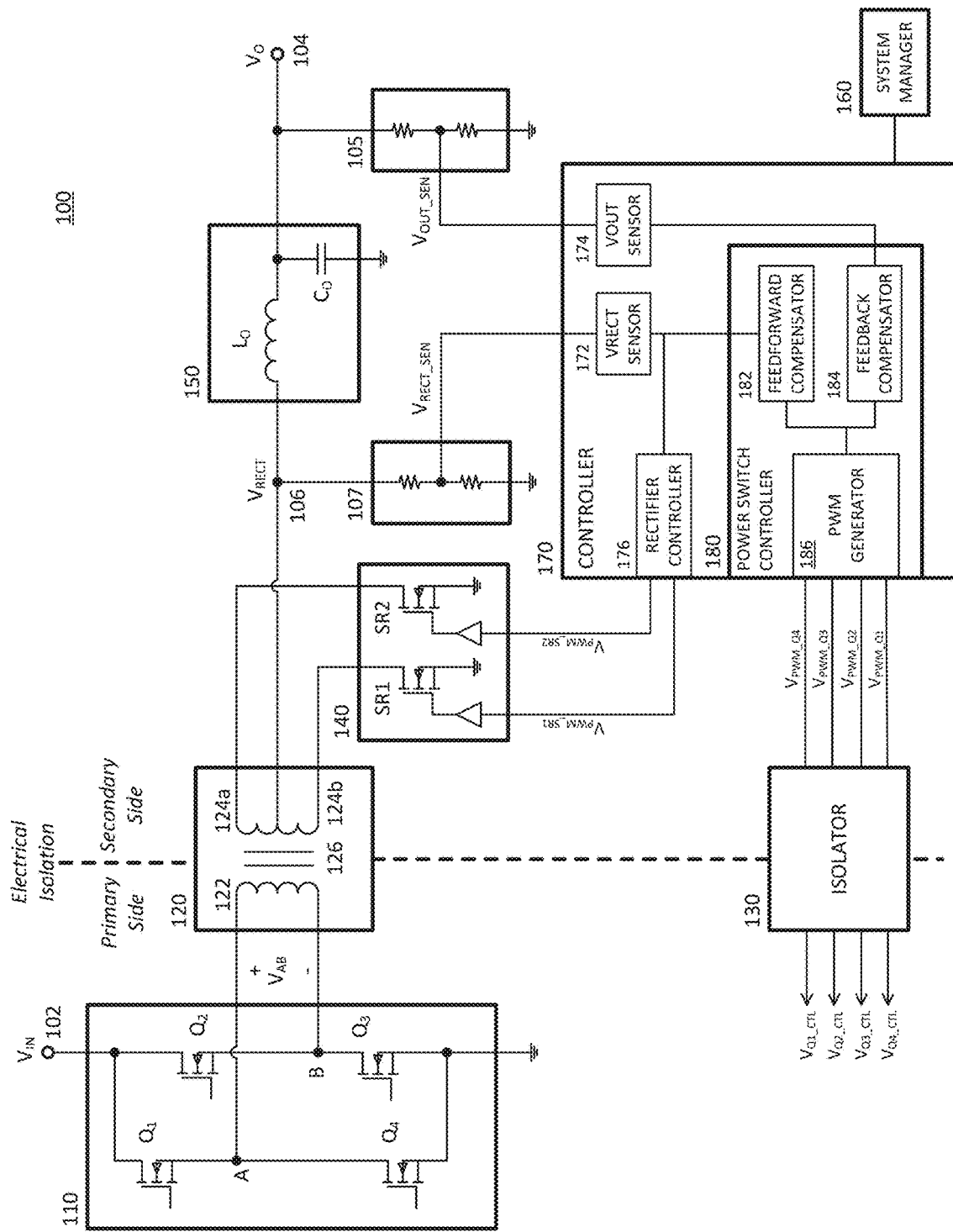
FIG. 1 illustrates a circuit diagram of an isolated switched-mode power converter in which the switch control uses feedforward compensation based upon a secondary-side rectified voltage.

The embodiments described herein provide techniques and circuits for quickly responding to power transients at the input to an isolated switched-mode power converter. These techniques avoid stability issues and undesirable oscillations in the output voltage, as merely opening the loop bandwidth of a closed-loop control might. The quick response is accomplished by using a feedforward compensator that augments closed-loop feedback control. Unlike other feedforward compensators, the feedforward compensator described herein is based on sensing a rectified voltage on the secondary side of an isolated power converter. Hence, the described techniques are advantageously implemented within a digital controller that is located on the secondary side of an isolated power converter.

Locating the digital controller on the secondary side of the isolated power converter provides several advantages. For example, the controller can readily communicate, without use of any isolation circuitry, over a digital system bus with a system manager that is also located on the secondary side of the power converter. The system manager typically communicates directly with a load, e.g., a microprocessor, that is powered by the power converter, and may itself be powered by the isolated power converter. Hence, the system manager is preferably located on the secondary side. As another exemplary advantage of locating the controller on the secondary side, consider that a controller using closed-loop feedback techniques senses the output voltage, and possibly the output current, of the power converter, so as to generate control signals for power switches of the power converter. By locating the controller on the secondary side, such sensing does not require a signal corresponding to the output voltage to pass through analog isolation circuitry at the primary-to-secondary boundary of the power converter. In addition to adding cost and circuit size to an isolated power converter, such analog isolation circuitry undesirably introduces delay and some amount of noise in the sensed signal(s). Locating the controller on the secondary side of a power converter avoids these problems.

However, locating the controller on the secondary side presents some difficulties for implementing feedforward compensation based upon the input voltage of the power converter. Sensing of the input voltage by a secondary-side controller requires that analog signals pass through isolation circuitry at the primary-to-secondary boundary of the power converter, if the integrity of the isolation barrier is to be maintained. Such isolation circuitry, particularly for supporting the transfer of analog signals, has nontrivial impacts on the cost and size of an isolated power converter, and are preferably avoided.

Embodiments of isolated switched-mode power converters described herein avoid and/or minimize the above-described problems. The techniques and circuits of these embodiments use a digital controller located on the secondary side of an isolated switched-mode power converter. In addition to providing closed-loop feedback control, the digital controller provides feedforward compensation. This feedforward compensation is based upon a rectified voltage sensed at a rectified voltage node on the secondary side of the isolated power converter. Because voltage perturbations at the power converter input are propagated to the rectified voltage node with little filtering delay, such feedforward control may be used to quickly respond to (compensate for) voltage transients at the input of the power converter. However, this feedforward control does not require dedicated analog isolation circuitry for transferring the input voltage across the primary/secondary boundary of the power converter. In typical embodiments of the inventions, as exemplified in the circuitry of FIG. 1, the only required isolation circuitry (other than a transformer) comprises digital isolators which are used for passing switch control signals from a secondary-side digital controller to switches of a power stage that is located on a primary side of the isolated power converter.

The rectified voltage might be sensed by the digital controller for other purposes, e.g., active rectification, in which case no additional circuit components are required to implement the techniques herein. The rectified voltage may be used to estimate the input voltage and to detect input voltage transients with minimal delay. The rectified voltage node is coupled to a secondary winding of the isolation transformer, and is notably on the winding side of filtering circuitry that couples the secondary winding to the output (load) of the power converter. Thus, the rectified voltage does not incur the significant delay typically associated with secondary-side filtering circuitry between the transformer and the load, e.g., a low-pass filter comprised of an inductor and output capacitor. This allows the feedforward compensation to respond quickly to input voltage transients, and has similar performance in terms of speed as would solutions requiring analog isolators to transfer the input voltage across the primary/secondary boundary for sensing by a secondary-side controller. Feedforward compensation based upon the rectified voltage, as described herein, provides much faster response to input voltage transients than control techniques based upon the output voltage of an isolated power converter, e.g., as provided by closed-loop feedback based upon the filtered output voltage.

Embodiments of power converter circuits and methods within power converters are provided in the following detailed description and the associated figures. The described embodiments provide particular examples for purposes of explanation, and are not meant to be limiting. Features and aspects from the example embodiments may be combined or re-arranged, except where the context does not allow this.

The techniques are described primarily in the context of DC-DC converters, but may also be used in AC-DC converters that use primary-side power switches and a transformer to control the power flow to a load. (These types of AC-DC converters may be considered as a primary-side AC rectifier which is coupled to an isolated DC-DC converter.) The described feedforward techniques may thus be used to quickly respond to AC voltage perturbations, such as brown-out conditions in which the AC voltage provided by a mains supply is reduced. Similarly, when power is supplied from a DC power source, DC voltage perturbations may occur when load current transients exceed the DC source's current or power capability, and the input voltage drops as the DC source enters current limited or snapback operation.

The techniques are initially described for an embodiment of an isolated switched-mode power converter using a full-bridge power stage on the primary side and a center-tapped secondary winding. This is followed by descriptions of embodiments of methods that use feedforward compensation techniques, including linear and nonlinear control techniques, based upon sensing a rectified voltage on the secondary side of a power converter. The described techniques may be readily applied to power converters having other primary and secondary-side topologies. A sampling of such embodiments is described next, in which feedforward compensation techniques based on a secondary-side rectified voltage are applied to power converters having other circuit topologies.

Power Converter Using Feedforward Compensation Based on Rectified Voltage Sensing FIG. 1 illustrates an isolated switched-mode power converter 100 within which the power control uses feedforward compensation based upon a rectified voltage $V_{RECT}$ on the secondary side of the power converter 100. The power converter 100 includes an input 102, an output 104, a rectified voltage node 106, a power stage 110, a transformer 120, an isolator 130, a rectifier 140, a filter 150, a system manager 160, and a digital controller 170. The input 102 is for coupling to an input power supply, and is supplied with an input voltage $V_{IN}$. The output 104 is for coupling to an output load, e.g., a microprocessor, and provides an output voltage $V_O$. Electrical (galvanic) isolation is provided by the transformer 120 and the isolator 130, which together partition the power converter 100 into a primary side and a secondary side, as shown in FIG. 1.

The input power source $V_w$ is provided to the power stage 110, which couples it to the transformer 120 using power switches. The illustrated power stage 110 includes four power switches $Q_1$, $Q_2$, $Q_3$, $Q_4$, which are oriented in a full-bridge configuration. The power switches are controlled via drivers, which are not shown for ease of illustration, that are connected to switch control signals $V_{Q1\_CTL}$, $V_{Q2\_CTL}$, $V_{Q3\_CTL}$, $V_{Q4\_CTL}$ output from the isolator 130. During an active interval within a positive half cycle of the power converter 100, the switches $Q_1$ and $Q_3$ are set to conduct, thereby providing a positive voltage to the transformer 120 across its input VA. During an active interval within a negative half cycle of the power converter 100, the switches $Q_2$ and $Q_4$ are set to conduct, thereby providing a negative voltage to the transformer 120 across its input $V_{AB}$. Additionally, there may be idle intervals during which none of the switches $Q_1$, $Q_2$, $Q_3$, $Q_4$ conduct and no voltage is provided to the transformer 120 across $V_{AB}$.

The power switches $Q_1$, $Q_2$, $Q_3$, $Q_4$ illustrated in FIG. 1 are enhancement-mode metal-oxide-semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications.

The transformer 120 includes a primary winding 122 having N1 turns, secondary windings 124a, 124b having N2 turns each, and a core 126. The secondary windings 124a, 124b are connected together at a center tap. A rectified voltage node 106 having a rectified voltage $V_{RECT}$ is coupled to this center tap. Neglecting practical effects such as resistive losses and a leakage inductance of the transformer 120, the turns ratio N2/N1 determines the ratio of the rectified voltage $V_{RECT}$ to the input voltage $V_{AB}$ of the transformer 120.

The rectifier circuit 140 is configured to rectify the voltage output from the secondary windings 124a, 124b, so as to provide the rectified voltage $V_{RECT}$ at the rectified voltage node 106. As shown in FIG. 1, the rectifier circuit 140 comprises rectification switches SR1 and SR2, each of which has an associated driver. The rectification switches SR1, SR2 are controlled by a rectifier controller 176 within the controller 170. Other rectification circuits or techniques may be used. For example, diodes may couple each outer terminal of the secondary windings 124a, 124b to a rectified voltage node, while the center tap is coupled to a ground of the load. In another alternate configuration, four diodes in a bridge configuration may be used with a secondary winding that has no center tap. In general, diode-based rectification is not preferred, particularly for low secondary-side voltages, due to the power loss associated with diodes, as compared with the active rectification using power switches SR1, SR2 as shown in FIG. 1. The illustrated rectification switches SR1, SR2 are enhancement-mode MOSFETS but, as with the power switches $Q_1$, $Q_2$, $Q_3$, $Q_4$, other switch types may be preferred in some applications.

The output filter 150 low-pass filters the rectified voltage $V_{RECT}$ using an output inductor $L_O$ and an output capacitor $C_O$. (Other filter types, including higher order filters and/or active filters, may be preferred in some applications.) The resultant filtered output voltage $V_O$ is provided to the output 104, for coupling to a load of the power converter 100. Note that the rectified voltage $V_{RECT}$ consists of a sequence of pulses having a frequency corresponding to a switching frequency of the power stage 110, whereas the filtered output voltage is relatively constant. Also, note that the filter 150 produces a significant delay between voltage changes at its input (rectified voltage node 106) and the output node 104.

The system manager 160 communicates with the controller 170 over a digital system bus. The system manager 160 also communicates with other system components including, e.g., an input power supply and a load that is connected to the power converter 100. The system manager 160 performs tasks such as providing the controller 170 with a target output voltage, output current information, etc.

The controller 170 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 170 may also include memory, e.g., non-volatile memory such as flash, that includes instructions or data for use by the processor circuitry, and one or more timers. The controller 170 inputs sensor signals such as signals corresponding to $V_O$ and $V_{RECT}$.

The controller 170 is responsible for controlling the power converter 100 so as to supply the necessary power to a load. The controller senses the rectified voltage $V_{RECT}$ and the output voltage $V_O$, and uses the sensed voltages to generate control signals $V_{PWM\_SR1}$, $V_{PWM\_SR2}$, $V_{PWM\_Q1}$, $V_{PWM\_Q2}$, $V_{PWM\_Q3}$, $V_{PWM\_Q4}$ for controlling the power switches of the rectifier circuit 140 and the power stage 110. A conditioning circuit 107 conditions the rectified voltage $V_{RECT}$ to provide a voltage level $V_{RECT\_SEN}$ that is appropriate for sensing by a $V_{RECT}$ sensor 172 within the controller 170. While the conditioning circuit 107 is illustrated in FIG. 1 as a resistive voltage divider, it may additionally or alternatively include filters, amplifiers, etc. in some implementations. A similar conditioning circuit 105 conditions the output voltage $V_O$ to provide a voltage level $V_{OUT\_SEN}$ that is appropriate for sensing by a $V_O$ sensor 174. The conditioning circuit 105 is also shown as a resistive voltage divider, but may include other components in some applications. In a typical implementation, the sensors 172, 174 include analog-to-digital converters (ADCs), and the conditioning circuits 107, 105 translate the voltages $V_{RECT}$, $V_O$ to voltages that are within input limits (e.g., levels, frequencies) of these ADCs. In some implementations, the conditioning circuits 105, 107 may not be necessary, and the controller 170 may directly sense the voltages $V_{RECT}$, $V_O$.

The rectifier controller 176 generates control signals $V_{PWM\_SR1}$, $V_{PWM\_SR2}$ for the rectifier switches SR1, SR2 so as to provide the (non-negative) rectified voltage $V_{RECT}$ at the rectified voltage node 106. These control signals $V_{PWM\_SR1}$, $V_{PWM\_SR2}$ may be based upon a sensed version $V_{RECT\_SEN}$ of the rectified voltage $V_{RECT}$, signals provided by the PWM generator 186, and/or a sensed current flowing through the rectifier switches SR1, SR2. (For ease of illustration, such current sensing is not shown.) Because such rectification techniques are well-known in the art, further detail regarding the rectifier controller 176 will not be provided.

The controller 170 also includes a power switch controller 180, which generates switch control signals for controlling the power switches of the power stage 110. The power switch controller 180 includes a feedback compensator 184, a feedforward compensator 182, and a PWM generator 186. The feedback compensator 184 inputs a sensed version of the output voltage $V_O$. The feedforward compensator 182 inputs a sensed version of the rectified voltage $V_{RECT}$. The feedback and feedforward compensators 184, 182 provide control parameters to the PWM generator 186, which generates, based upon the provided control parameters, control signals $V_{PWM\_Q1}$, $V_{PWM\_Q2}$, $V_{PWM\_Q3}$, $V_{PWM\_Q4}$ for controlling the power switches of the power stage 110.

The power switch controller 180 and its PWM generator 186 may use one or more control techniques. For example, the PWM generator 186 might generate control signals having a fixed frequency and variable duty cycle, in which case the control parameters provided by the compensators 182, 184 are duty cycle parameters. Alternatively, the PWM generator 186 might generate control signals having fixed pulse widths and variable frequencies, in which case the control parameters provided by the compensators 182, 184 are frequency parameters. In another alternative, the PWM generator 186 may generate phase-shift-modulated (PSM) signals, in which case the control parameters provided by the compensators 182, 184 are phase shift parameters. These and other techniques are well-known within the field of feedback compensation, e.g., based on linear control techniques. Hence, the following descriptions will focus primarily on feedforward compensation techniques.

The switch control signals $V_{PWM\_Q1}$, $V_{PWM\_Q2}$, $V_{PWM\_Q3}$, $V_{PWM\_Q4}$ output from the controller 170 are provided to the secondary side of the isolator 130 which, in turn, outputs the primary-side control signals $V_{Q1\_CTL}$, $V_{Q2\_CTL}$, $V_{Q3\_CTL}$, $V_{Q4\_CTL}$.

Figure 2:
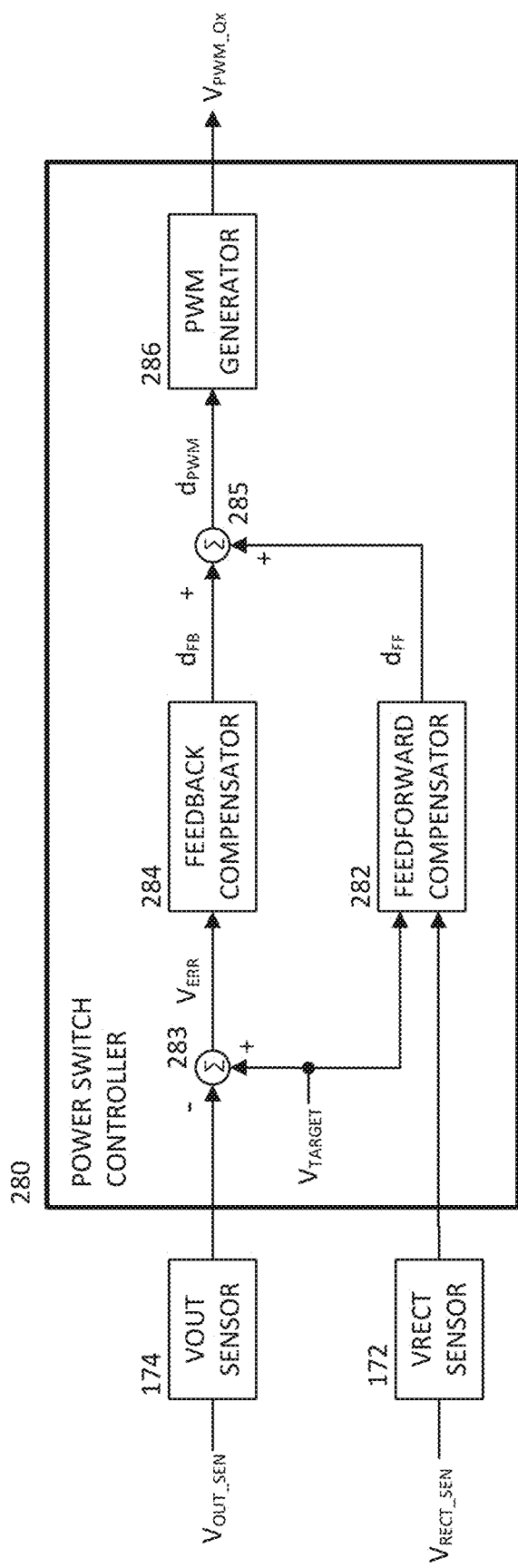
FIG. 2 illustrates a schematic diagram for a power switch controller, such as that included in FIG. 1.

FIG. 2 illustrates an embodiment of a power switch controller 280, as could be used in the controller 170 of FIG. 1. The power switch controller 280 is initially described as using PWM with a fixed frequency and variable duty cycle. Alternative techniques are described subsequently.

The $V_{OUT}$ sensor 174 inputs the output voltage $V_O$, or a variant $V_{OUT\_SEN}$ thereof, and provides a digital version of this voltage to the power switch controller 280. Similarly, the $V_{RECT}$ sensor 172 inputs the rectified voltage $V_{RECT}$, or a variant $V_{RECT\_SEN}$ thereof, and provides a digital version of this voltage to the power switch controller 280. A first adder 283 subtracts the digitized output voltage from a target voltage $V_{TARGET}$ to generate an error voltage $V_{ERR}$. The target voltage $V_{TARGET}$ may be stored in a memory of the power switch controller 280. The error voltage $V_{ERR}$ is used by the feedback compensator 284 to generate a feedback duty cycle $d_{FB}$. The feedback compensator 284 typically includes a linear controller, such as a proportional-integral-derivative (PID) controller, to generate the feedback duty cycle $d_{FB}$. Within the field of voltage regulation, linear controllers typically input an error signal and use this error signal to produce a control parameter, e.g., duty cycle. Linear controllers, more particularly, obey the superposition principle, meaning generally that the output control parameter is proportional to the error signal. For example, consider a certain error signal that produces a certain corresponding change in an output duty cycle. An error signal that is twice the certain error signal will result in a duty cycle change that is twice that of the certain corresponding change in duty cycle. Because closed-loop control, such as PID control, is well known in the art, further details of such control are not provided herein.

A feedforward compensator 282 effectively estimates, directly or indirectly, the input voltage VI using the rectified voltage $V_{RECT}$. When the rectified voltage $V_{RECT}$ is active (non-zero), its level tracks the input voltage $V_{IN}$. The feedforward compensator 282 characterizes the rectified voltage $V_{RECT}$ when this voltage is within an active pulse. There are multiple ways in which this may be accomplished. In a first sub-embodiment, a single sample is captured within an active pulse of the rectified voltage $V_{RECT}$. For example, a sample may be captured in the middle of the active pulse or at the end of the active pulse. In a second sub-embodiment, multiple samples are captured within the active pulse and these samples are averaged to generate a characteristic value for the active pulse. In a third sub-embodiment, the samples within the active pulse are filtered, e.g., using a weighted average, to provide a characteristic value which has high-frequency noise components removed, but which well-approximates the rectified voltage $V_{RECT}$ at the end of the active pulse being measured.

The characteristic value for an active pulse of $V_{RECT}$ is used to generate a feedforward duty cycle $d_{FF}$ based, e.g., on a comparison with the target voltage $V_{TARGET}$. The feedforward duty cycle $d_{FF}$ may be considered a baseline that provides a coarse setting for a switch control signal duty cycle, whereas the feedback duty cycle $d_{FB}$ provides fine adjustments that vary relatively slowly. For purposes of explanation, consider an example in which the input voltage $V_{IN}$ of the power converter is expected to be 48V, the turns ratio (N2:N1) of the transformer 120 is 6, the target voltage $V_{TARGET}$ is 5V, and a load is drawing a nominal, steady current from the power converter 100. Neglecting practical effects such as switch losses, leakage inductance, etc., the expected value for an active pulse of the rectified voltage $V_{RECT}$ is 8V. To achieve the target voltage $V_{TARGET}$ of 5V after filtering, the feedforward compensator 282 may set a feedforward duty cycle of 5/8 (62.5%) for a sensed rectified voltage waveform $V_{RECT}$ of 8V. So as to address issues with noise and/or to avoid sharp transitions, the feedforward compensator 282 may include a low-pass filter and/or it may apply an offset to reduce a calculated duty cycle before providing such value at its output. Such techniques may be used to ensure that the feedforward duty cycle $d_{FF}$ provided at the output of the feedforward compensator 282 does not lead to excessive changes or oscillations in the power (voltage and current) supplied by the power converter 100.

The feedforward compensator 282 does not necessarily need to calculate the exact ratio of the target voltage $V_{TARGET}$ to the rectified voltage $V_{RECT}$, as described above. In an alternative sub-embodiment, a deviation from a nominal duty cycle may be computed based on a detected deviation from a nominal rectified voltage. For example, with a nominal output (target) voltage of 5V, and nominal rectified voltage of 8V, the nominal duty cycle would be 5/8 or 62.5%. If a sensed rectified voltage is higher than this nominal rectified voltage by 10%, i.e., $V_{RECT}$=8.8V for this example, then the feedforward compensator provides a duty cycle that is decreased by 10% relative to the nominal duty cycle, i.e., the duty cycle is set to 56.25%. Such a duty cycle is close to the ideal ratio of 5/8.8 (56.82%), and can be effectively used when the deviations from a nominal output voltage and input voltage are well bounded. Such a technique has the advantage of requiring only the rectified voltage information, i.e., not explicitly using a reference target voltage, and of having simpler computation.

For either of the above examples, a sensed voltage of $V_{RECT}$ corresponding to a reduced rectified voltage $V_{RECT}$ (i.e., below 8V) would lead to larger feedforward duty cycle $d_{FF}$, whereas a sensed voltage of $V_{RECT}$ corresponding to a higher rectified voltage $V_{RECT}$ (i.e., above 8V) would lead to a smaller feedforward duty cycle $d_{FF}$. (This will be explained further in relation to the waveforms of FIGS. 3 and 4.)

The feedforward duty cycle $d_{FF}$ is added to the feedback duty cycle $d_{FB}$ by a second adder 285, and the resultant duty cycle $d_{PWM}$ is provided to a PWM generator 286. The PWM generator 286 generates switch control signals, e.g., $V_{PWM\_Q1}$, $V_{PWM\_Q2}$, $V_{PWM\_Q3}$, $V_{PWM\_Q4}$, based upon the duty cycle $d_{PWM}$. These switch control signals then control the amount of power transferred by the power stage 110 to the transformer 120 and, ultimately, to a load of the power converter 100.

The above description of the power switch controller 280 is based upon control techniques that use a fixed switching frequency and variable duty cycle. However, the described techniques are readily extrapolated to use other control techniques. For example, control techniques using fixed pulse widths and variable frequency may be used. In this case, the feedback and feedforward compensators would provide frequency values rather than duty cycle values, and the PWM generator would base its switch control signals on these frequency values. In another example, phase-shift modulation (PSM) may be used, in which case the feedback and feedforward compensators would provide phase shift values, which would be used by the PWM generator to generate its switch control signals. As will be described further below, the power switch controller may also use a combination of control techniques.

Figure 3:
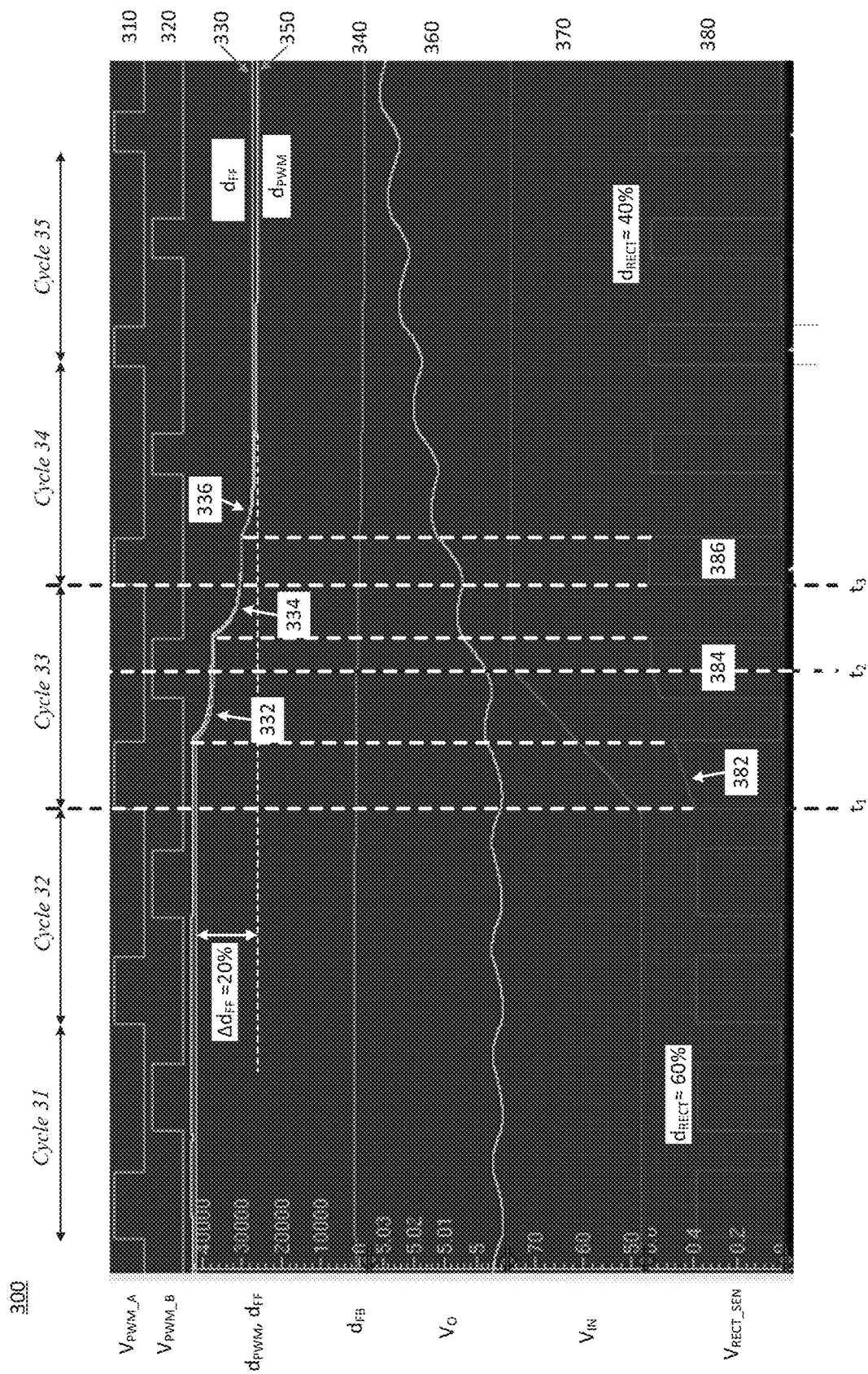
FIG. 3 illustrates waveforms corresponding to voltages and control signals in the power converter of FIG. 1, for a scenario in which an input voltage increases.

FIG. 3 illustrates waveforms 300 associated with operation of a power converter such as that illustrated in FIG. 1. These waveforms 300 correspond to a situation in which an input voltage $V_{IN}$ increases from 48V to 75V between times $t_1$ and $t_2$. The load current, e.g., the current flowing from the output 104 in the power converter 100 of FIG. 1, is stable (relatively constant) throughout the timeframe illustrated in FIG. 3.

The waveform 310 denoted $V_{PWM\_A}$ corresponds to the switch control signals $V_{PWM\_Q1}$, $V_{PWM\_Q3}$, which are used to apply a positive voltage pulse to the transformer 120 across $V_{AB}$. The waveform 320 denoted $V_{PWM\_B}$ corresponds to the switch control signals $V_{PWM\_Q2}$, $V_{PWM\_Q4}$, which are used to apply a negative voltage pulse to the transformer 120 across $V_{AB}$. As shown in cycles 31 and 32, each of these waveforms 310, 320 has a duty cycle of approximately 30%, meaning that energy is transferred across the transformer 120 approximately 60% of the time. Note that each pulse of $V_{PWM}\_A$, $V_{PWM}\_B$ within these waveforms 310, 320 has a corresponding pulse in the rectified voltage $V_{RE}CT$, as shown in the $V_{RECT\_SEN}$ waveform 380. The duty cycle for each of the switch control signal waveforms 310, 320 is half of the duty cycle of the waveform 380 corresponding to the rectified voltage $V_{RECT}$.

The waveform 330 corresponds to a feedforward duty cycle $d_{FF}$, as output by the feedforward compensator 282 of FIG. 2. The waveform 340 corresponds to a feedback duty cycle de, as output by the feedback compensator 284 of FIG. 2. The waveform 350 corresponds to a PWM duty cycle $d_{PWM}$, which is a combination, e.g., summation, of the feedforward and feedback duty cycles $d_{FF}$, $d_{FB}$.

The waveform 360 corresponds to an output voltage $V_O$ of a power converter. The output voltage $V_O$ has a target value of 5V, which is maintained except for a small ripple and a slight increase starting at time $t_1$. The waveform 370 corresponds to an input voltage $V_{IN}$ which, as illustrated, begins at 48V and increases, beginning at time $t_1$, to 75V. The waveform 380 corresponds to a sensed version $V_{RECT\_SEN}$ of the rectified voltage $V_{RECT}$. For example, a conditioning circuit such as the voltage divider 107 of FIG. 1 may be configured to reduce the rectified voltage $V_{RECT}$ to an acceptable range, e.g., 0 to 1V, for sensing. For the illustrated input voltage $V_{IN}$ and a transformer turns ratio N2/N1=6, a voltage division of approximately 20 provides the illustrated sensed rectified voltage $V_{RECT\_SEN}$, i.e., rectified pulse amplitudes of 0.4 to 0.6V.

Starting at time $t_1$ (the start of cycle 33), the input voltage $V_{IN}$ begins rising, which leads to an increase 382 in the sensed rectified voltage $V_{RECT\_SEN}$. In response to this increase 382, the feedforward duty cycle $d_{FF}$ decreases 332. This decrease 332 is low-pass filtered such that its full effect occurs after approximately half of a switching cycle of the power converter.

The input voltage $V_{IN}$ rises linearly until time $t_2$, at which point it maintains a level of 75V. The second pulse 384 of the rising sensed rectified voltage $V_{RECT\_SEN}$ follows this change in the input voltage $V_{IN}$, and leads to a further decrease 334 in the feedforward duty cycle $d_R$.

By the start of cycle 34 (time $t_3$), the input voltage $V_{IN}$ has stabilized leading to a pulse 386 of the sensed rectified voltage $V_{RECT\_SEN}$ having a stable voltage. Because the sensed voltage of the pulse 386 is higher than that of the pulse 384, the feedforward duty cycle $d_{FF}$ decreases 336 again. For each pulse of the sensed rectified voltage $V_{RECT\_SEN}$, a new feedforward duty cycle $d_{FF}$ may be computed and used in generating switch control signals for the power stage 110. Hence, the feedforward compensation is updated for each half cycle of the power converter in this example.

As shown in the illustrated timeframe of the waveforms 300 in FIG. 3, the PWM duty cycle $d_{PWM}$ does not vary much from the feedforward duty cycle $d_{FF}$. The feedforward duty cycle $d_{FF}$, largely compensates for the transient increase in the input voltage $V_{IN}$, and does so in a very fast and effective manner. Despite an input voltage $V_{IN}$ increase from 48V to 75V (56%), the output voltage $V_O$ only increases from slightly under 4.995 to about 5.03V (0.7%). While not shown within the illustrated timeframe, the feedback compensation (and its feedback duty cycle $d_{FS}$) will slowly regulate the output voltage $V_O$ back to its target voltage of about 5V. (The feedback compensation is relatively slow acting, and its effects are filtered to occur over several cycles of the power converter.)

Figure 4:
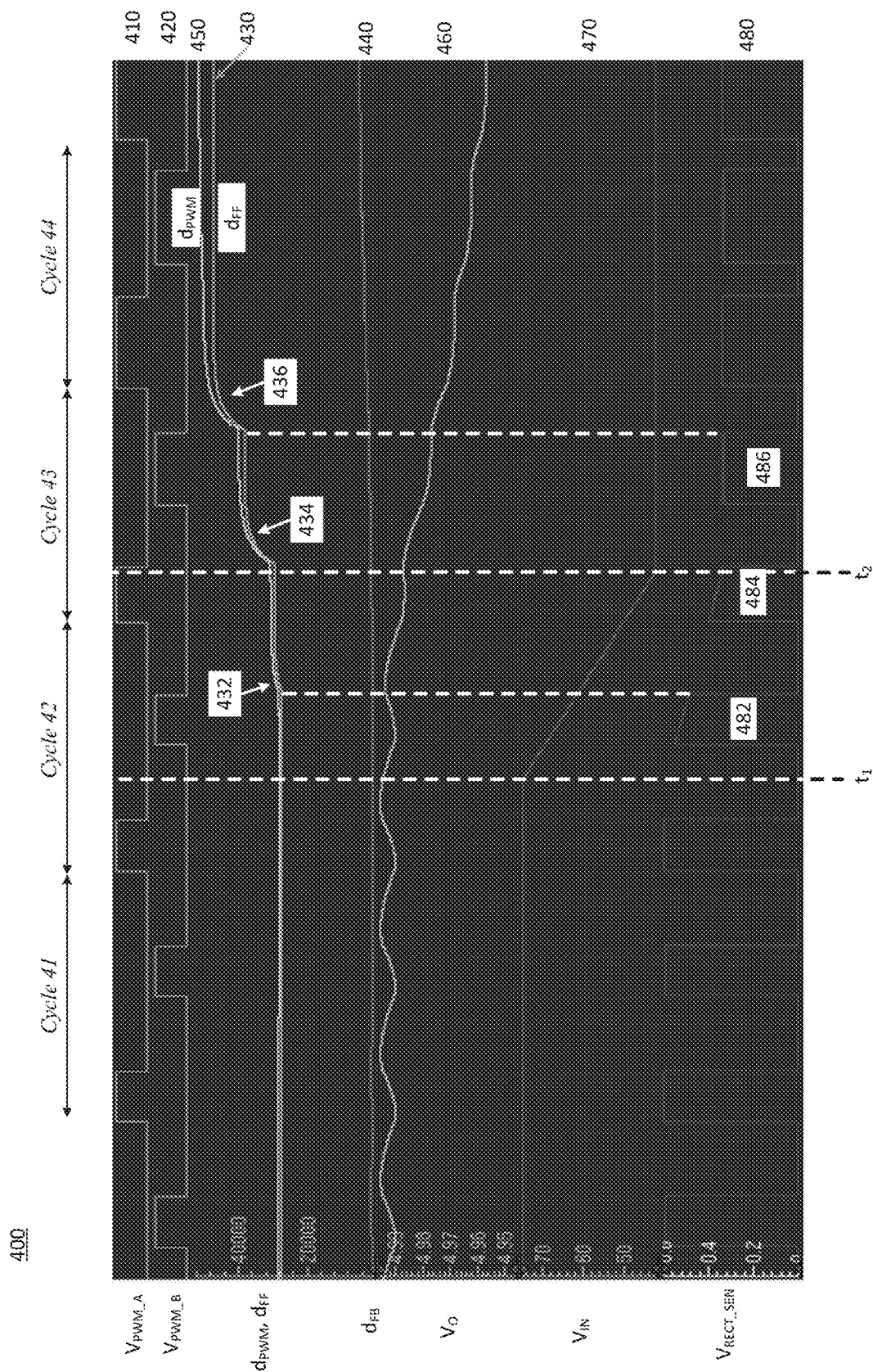
FIG. 4 illustrates waveforms corresponding to voltages and control signals in the power converter of FIG. 1, for a scenario in which an input voltage decreases.

FIG. 4 illustrates waveforms 400 for a situation in which the input voltage V decreases from 75V to 48V between times $t_1$ and $t_2$. The waveforms 400 are similar to the waveforms 300 of FIG. 3, and the description below focuses on aspects related to the different scenario (decreasing input voltage) of FIG. 4.

As the input voltage $V_{IN}$ decreases from time $t_1$ to time $t_2$, pulses of the sensed rectified voltage $V_{RECT}$ decrease also, as shown in the pulses labelled 482, 484 and 486. In response to the first decreasing pulse 482, the feedforward duty cycle $d_{FF}$ increases 432 beginning immediately after the pulse 482. In response to the further decrease exhibited in the pulse 484, the feedforward duty cycle $d_{FF}$ increases 434 further beginning immediately after the pulse 484. The sensed rectified voltage $V_{RECT}$ reaches a steady state by pulse 486. In response to the lower voltage of pulse 486 relative to the prior pulse 484, a yet further increase 436 in the feedforward duty cycle $d_{1r}$ is made.

Note that the feedforward compensation does not fully compensate for the input voltage change, as is indicated by the illustrated decrease in the output voltage $V_O$ from approximately 4.99V to approximately 4.955V. However, use of the feedforward compensation provides an output voltage droop of only 0.7% in response to the input voltage drop of 27%. As seen in cycles 43 and 44, the feedback duty cycle $d_{FB}$ is slowly increasing so as to compensate for this slight drop in the output voltage. While not shown within the timeframe of the waveforms 400 of FIG. 4, the feedback duty cycle $d_{FB}$ will continue increasing so as to bring the output voltage $V_O$ back to its target of 5V.

Methods for Feedforward Compensation Based on Rectified Voltage

Described below are embodiments of methods which use feedforward compensation based upon a rectified voltage that is sensed on the secondary side of an isolated switched-mode power converter. These methods may be implemented within a power converter such as that illustrated in FIG. 1. In a first method embodiment, a method is described that corresponds closely to the techniques described above in relation to FIGS. 1-4. Variations of this method are described wherein different parameters are used for the control variable. In a second method embodiment, control techniques are described in which a switching frequency is based upon feedforward compensation techniques and a switching duty cycle is based upon feedback compensation techniques. In a third method embodiment, feedforward compensation is only used when a change in the rectified voltage exceeds a threshold. In a sub-embodiment of this method, a change in the rectified voltage that exceeds a threshold triggers use of a nonlinear feedforward compensation technique.

Figure 5:
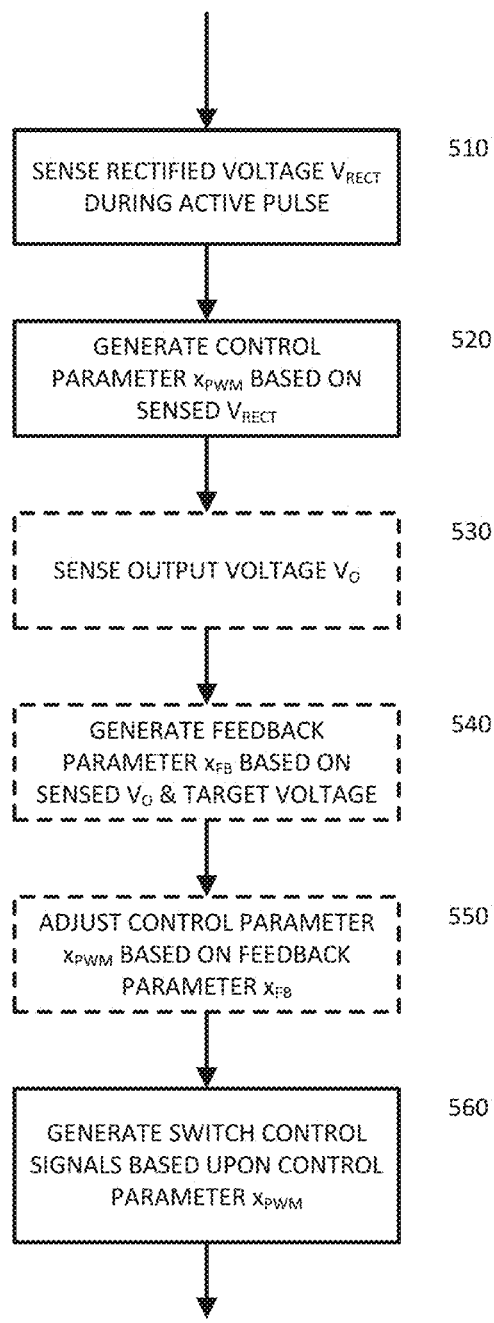
FIG. 5 illustrates a method for generating switch control signals based upon feedforward compensation techniques that use a rectified voltage sensed on a secondary-side of an isolated switched-mode power converter.

FIG. 5 illustrates a method 500 for using feedforward compensation based upon a rectified voltage $V_{RECT}$ on the secondary side of a power converter. The method begins with sensing 510 the rectified voltage $V_{RECT}$ during an active pulse of the rectified voltage $V_{RECT}$. For example, the rectified voltage $V_{RECT}$, or a variant thereof, may be sampled once or multiple times during the active pulse. If multiple samples are captured, they may be filtered or a single sample may be treated as characteristic for the active pulse. In a typical implementation, the sample or samples are digitized using an ADC. Next, a control parameter $x_{PWM}$ is generated 520 based upon the sensed rectified voltage. This is followed by steps of sensing 530 an output voltage $V_O$ of the power converter and generating 540 a feedback control parameter $x_{FB}$e based upon a comparison of the output voltage $V_O$ and a target voltage $V_{TARGET}$. For example, the feedback control parameter $x_{FB}$ may be a duty cycle, frequency, or phase shift that is output from a linear controller using PID control techniques. The feedback control parameter $x_{FB}$ is used to adjust 550 the control parameter $x_{PWM}$, e.g., via an addition, subtraction, multiplication. The resultant control parameter $x_{PWM}$ is then used to generate 560 switch control signals. The switch control signals drive power switches on a primary side of the power converter so as to control the amount of power transferred from an input power source to the power converter and, ultimately, to a load connected to the output of the power converter.

In a first sub-embodiment of the method 500 of FIG. 5, the control parameter $x_{PWM}$ and the feedback control parameter $x_{FB}$ are each duty cycles and the switch control signals use a fixed frequency. A decrease in the input voltage of the power converter would lead to a decrease in the sensed rectified voltage. For this sub-embodiment, such voltage decreases would generate an increase in the duty cycle used in generating the switch control signals, so as to compensate for the power transfer reduction caused by the input voltage reduction. In a second sub-embodiment of the method 500, the control parameter $x_{PWM}$ and the feedback control parameter $x_{FB}$ are each frequencies and the switch control signals use fixed pulse widths. An increase in these frequencies causes increased power transfer intervals, which can compensate for an input voltage reduction. In a third sub-embodiment of the method 500, the control parameter $x_{PWM}$ and the feedback control parameter $x_{FB}$ are each phase shifts and the switch control signals are phase-shift modulated (PSM). The phase shifts may be adjusted so as to increase the amount of time that power is transferred from the input power source, and can thus be used to compensate for increases or decreases in the input voltage of the power source.

As described above, the method 500 uses both feedforward compensation techniques, as provided by steps 510 and 520, and feedback compensation techniques, as provided by steps 530, 540 and 550. As indicated by the dotted blocks 530, 540 and 550, the feedback compensation techniques are optional and may be omitted in some applications, e.g., applications that do not require tight voltage regulation and/or applications in which the load has a fairly constant current draw. By omitting the feedback compensation steps 530, 540 and 550, the method 500 only describes steps for a feedforward compensation technique.

While the method 500 described above generates the same type of control parameter using feedforward techniques based upon the rectified voltage $V_{RECT}$, e.g., as in step 520 of the method 500, and using feedback techniques based upon the output voltage $V_O$, e.g., as in step 540 of the method 500, these control parameters need not be the same. An example of a method in which different control parameter types are generated is shown in FIG. 6.

Figure 6:
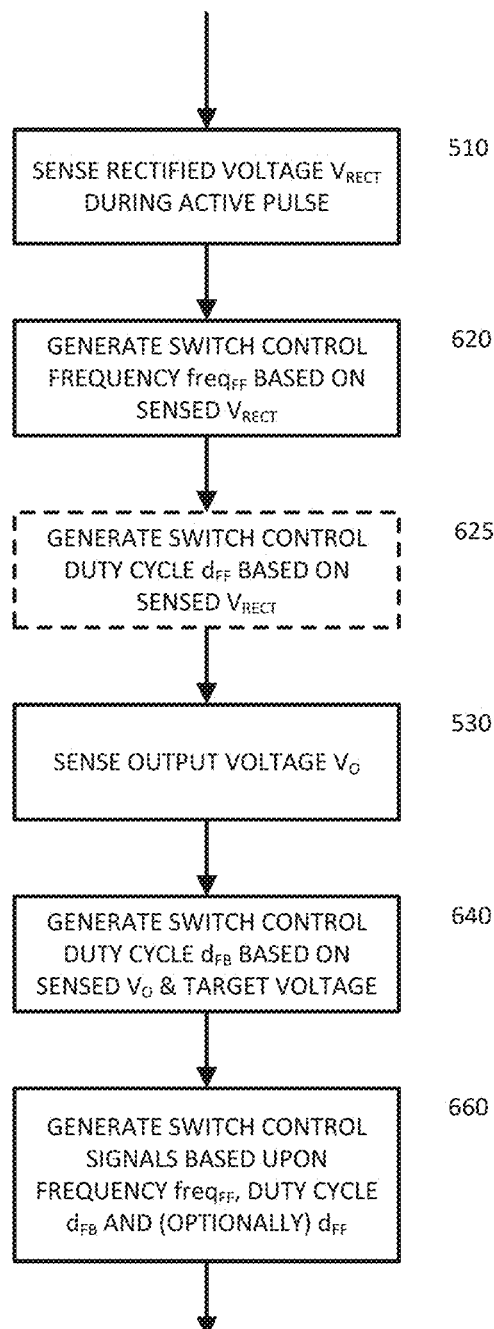
FIG. 6 illustrates a method for generating switch control signals that have a frequency generated using feedforward techniques and a duty cycle generated using feedback control.

FIG. 6 illustrates a method 600 for generating switch control signals based upon feedforward and feedback compensation techniques. This method is similar to the method 500 of FIG. 5, and only those steps that differ are explained below. The method includes a step 620 for generating a switch control frequency $freq_{FF}$ using feedforward compensation techniques based upon a sensed rectified voltage $V_{RECT}$. In an optional step 625, a switch control duty cycle $d_{FF}$ is generated using feedforward compensation techniques based upon a sensed rectified voltage $V_{RECT}$. In a step 640, a feedback switch control duty cycle $d_{FB}$ is generated based upon the output voltage $V_O$ and a target voltage $V_{TARGET}$. In a final step 660, switch control signals are generated based upon the frequency $freq_{FF}$, the duty cycle $d_{FB}$ and, optionally, the duty cycle $d_{FF}$. The method 600 of FIG. 6 may have particular advantages when a large change in the input voltage (and sensed rectified voltage $V_{RECT}$) leads to large reductions in the duty cycle of the switch control signals. The small resultant duty cycle means that there are long time intervals between active pulses of the rectified voltage $V_{RECT}$ which, in turn, means there is an unnecessarily high level of ripple in the output voltage $V_O$. By increasing the switching frequency (reducing the switching period) using the feedforward frequency $freq_{FF}$, this output ripple may be reduced. Such changes to the frequency are typically accompanied by a commensurate reduction in the feedforward duty cycle $d_{FF}$.

Figure 7:
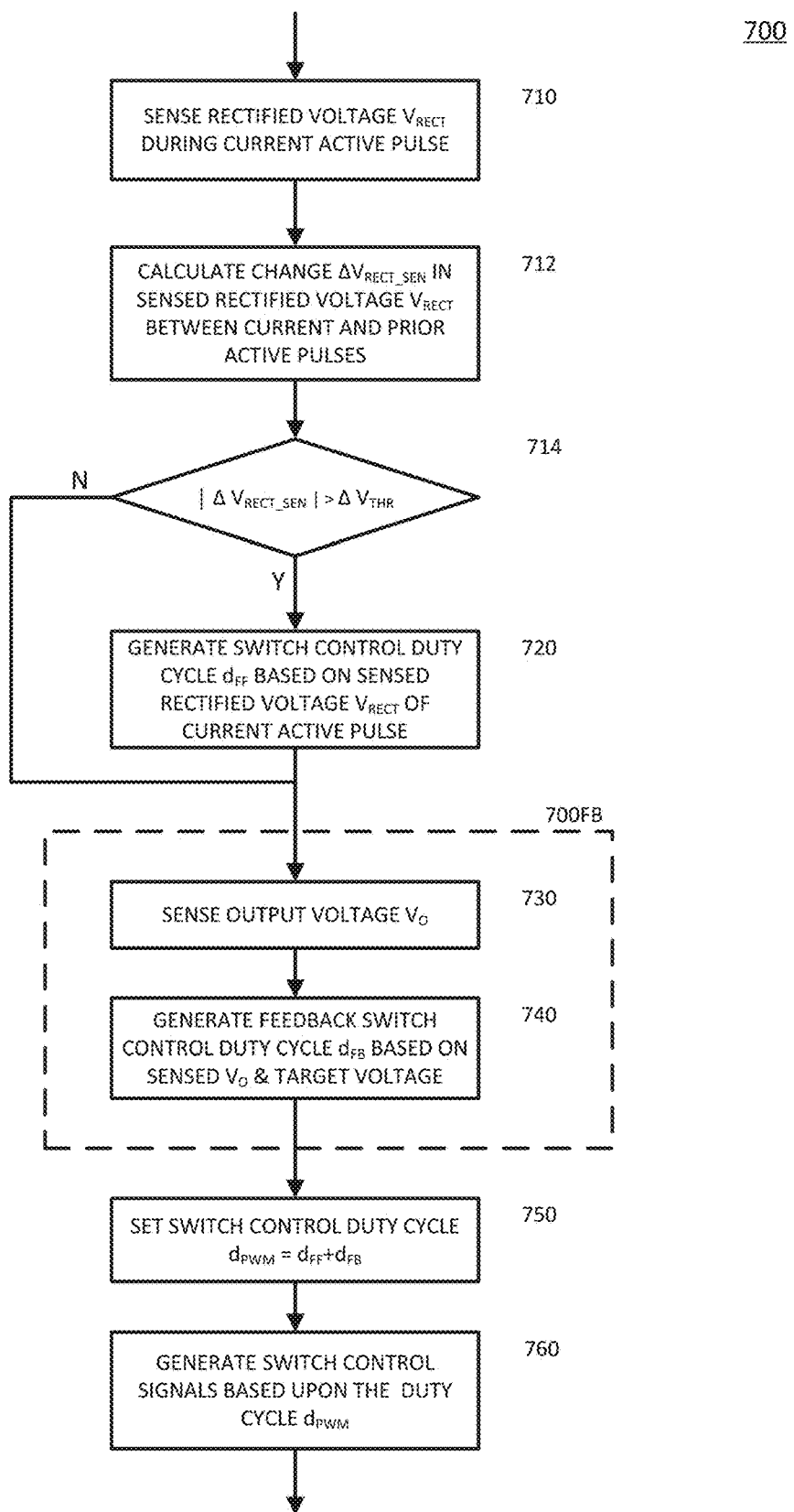
FIG. 7 illustrates a method for generating switch control signals in which feedforward compensation techniques are activated when a change in a sensed rectified voltage magnitude exceeds a threshold.

The input voltage $V_{IN}$ of a power converter and the corresponding rectified voltage $V_{RECT}$ include some (relatively low) level of noise, which cannot be effectively tracked by a feedforward compensation technique. Furthermore, slow changes in the input voltage, and the corresponding sensed rectified voltage $V_{RECT}$, may be effectively compensated by the feedback control loop. Hence, it may be desired to only enable feedforward compensation when the rate of change of the sensed rectified voltage $V_{RECT}$ exceeds some threshold level. FIG. 7 illustrates an embodiment of a method that uses such a technique.

FIG. 7 illustrates a method 700 that is similar to the method of FIG. 5, but in which feedforward compensation techniques are only used when a change in the sensed rectified voltage $V_{RECT}$ exceeds some threshold. For ease of explanation, the method 700 is described using duty cycle as the switch control parameter. However, it should be understood that other switch parameter types and/or a combination of different switch parameter types may be used, as described above in relation to the methods 500, 600 of FIGS. 5 and 6.

The method 700 begins with a sensing 710 of the rectified voltage $V_{RECT}$ during an active pulse of the rectified voltage $V_{RECT}$. The result of this sensing is compared 712 against the sensed rectified voltage $V_{RECT}$ from a previous active pulse to create a difference $\Delta V_{RECT\_SEN}$. The magnitude of this difference voltage $\Delta V_{RECT\_SEN}$ is compared 714 against a threshold $\Delta V_{THR}$. The threshold $\Delta V_{THR}$ may be set to a value just higher than an expected noise component of the sensed rectified voltage $V_{RECT}$ and/or to a value above which the feedback control loop cannot effectively maintain the output voltage $V_O$ within an acceptable tolerance of the target voltage $V_{TARGET}$. If the change in the magnitude of this difference voltage $\Delta V_{RECT\_SEN}$ is greater than the threshold $\Delta V_{THR}$, a feedforward duty cycle $d_{FF}$ is generated (updated) 720 based upon the sensed rectified voltage $V_{RECT}$ of the current active pulse. Otherwise, the updating step 720 is skipped and the feedforward duty cycle $d_{FF}$ remains unchanged from a previously-stored value. (The previously-stored value may be the result of a generation 720 taking place in a prior switching cycle or half cycle of the power converter, or may be an initial value preloaded before the method begins.)

The method continues with feedback compensation techniques 700FB, which include sensing 730 an output voltage $V_O$ and generating 740 a feedback switch control duty cycle $d_{FB}$ based upon the sensed output voltage $V_O$ and a target voltage $V_{TARGET}$. The feedforward and feedback duty cycles $d_{FF}$, $d_{FB}$ are summed 750 to create a switch control duty cycle $d_{PWM}$. Switch control signals are then generated 760 based upon the switch control duty cycle $d_{PWM}$. The switch control signals drive power switches in the power stage of the power converter and control the amount of power transferred from an input power source to the power converter and, ultimately, to a load powered by the power converter.

The steps of the method 700 may be rearranged except where parameter interdependencies do not allow this. For example, the feedback compensation steps 700FB may be performed before the feedforward compensation and related steps 710, 712, 714, 720.

The method 700 of FIG. 7 may be used to quickly ramp up a switch control duty cycle $d_{PWM}$ during a start-up of a power converter, e.g., when the input voltage is initially coupled to a power converter or is otherwise ramped from zero (or near zero) voltage. This provides a significant start-up advantage over techniques that rely solely on closed-loop feedback, and its slow adjustment/settling speed. At the start-up of a power converter, a storage (memory) containing values corresponding to the sensed rectified voltage $V_{RECT}$ of a prior active pulse and the feedforward duty cycle $d_{FF}$ may be set to initial values, e.g., zero. As the input voltage ramps up, the sensed rectified voltage $V_{RECT}$ will also ramp up such that the voltage threshold $\Delta V_{THR}$ is exceeded and the feedforward compensation is activated so as to generate (update) 720 the feedforward duty cycle $d_{FF}$ based on the sensed rectified voltage $V_{RECT}$ of the current active pulse. This results in the switch control duty cycle $d_{PWM}$, and the output voltage $V_O$, quickly reaching a steady-stage desired value at which a load coupled to the power converter may begin its operation.

The method 700 of FIG. 7 differs from the methods described in relation to FIGS. 5 and 6 in that the method 700 uses a nonlinear feedforward compensation related to the comparison 714 against the threshold $\Delta V_{THR}$. Other linear or nonlinear feedforward compensation techniques may be preferred in some applications. For example, detecting that a magnitude of the voltage difference $\Delta V_{RECT\_SEN}$ is above some threshold $\Delta V_{THR\_DIS}$ may disable the feedback control loop 700FB for one or more cycles of the power converter, in which case the switch control signals are generated based on the feedforward compensation parameter (e.g., $d_{FF}$) without any input from the feedback control loop (e.g., $d_{FB}$ is set to zero). In another example, detecting that the (signed) voltage difference $\Delta V_{RECT\_SEN}$ is below some threshold $\Delta V_{THR\_LOW}$ or above some threshold $\Delta V_{THR\_HIGH}$ causes a change in the control method. For example, the control signal generation may change from having duty cycle as the control parameter to having frequency or phase shift as the control parameter. In yet another example, according to a nonlinear technique, a large change in $\Delta V_{RECT\_SEN}$ may trigger an immediate truncation of switch control signals so as to curtail input power or, conversely, may trigger an immediate activation of switch control signals so as to immediately provide input power. Such feedforward techniques may react quickly to input voltage changes and, thereby, prevent significant over or undervoltage scenarios in the output voltage $V_O$.

Feedforward Compensation Techniques in Other Power Converter Topologies

The above embodiments have been described in the context of an isolated power converter having a full bridge power stage, a center-tapped secondary winding, and a full-wave rectifier. The described feedforward compensation techniques are readily applied to other isolated topologies that are characterized in their use of an inverter to convert an input DC voltage into an AC voltage which is coupled to a transformer using a primary-side power stage or switches, a secondary-side rectifier to convert an AC voltage into a DC voltage using power stages or switches, and an output filter. For example, the primary-side power stage may comprise a half bridge topology, an active-clamp forward topology, or a push-pull topology. The transformer secondary may comprise a center-tapped secondary winding, multiple secondary windings, or a single (non-tapped) secondary winding. Also on the secondary side of the power converter, the rectification circuitry may comprise a half-wave rectifier, a full-wave rectifier, a current doubler, or interleaved rectifiers. Due to the number of different topology combinations and because the feedforward techniques are the same or similar for different topologies, only a sampling of additional topologies are described below. For each of the topologies, the feedforward compensation techniques comprise sensing at least a first rectified voltage $V_{RECT}$ on the secondary side of a power converter, and generating or adjusting signals used to control primary-side switches within a power stage of the power converter based upon the sensed rectified voltage $V_{RECT}$. The specific node for sensing the rectified voltage $V_{RECT}$ and the generation of switch control signals varies may vary according to the topology. For ease of illustration and description in the power converters of FIGS. 8-16, components that are similar or the same as those described in relation to FIGS. 1-4 are omitted. For example, voltage sensors, isolators, and controller connections are not illustrated in the figures described below, as these elements may be readily extrapolated from FIG. 1.

Figure 8:
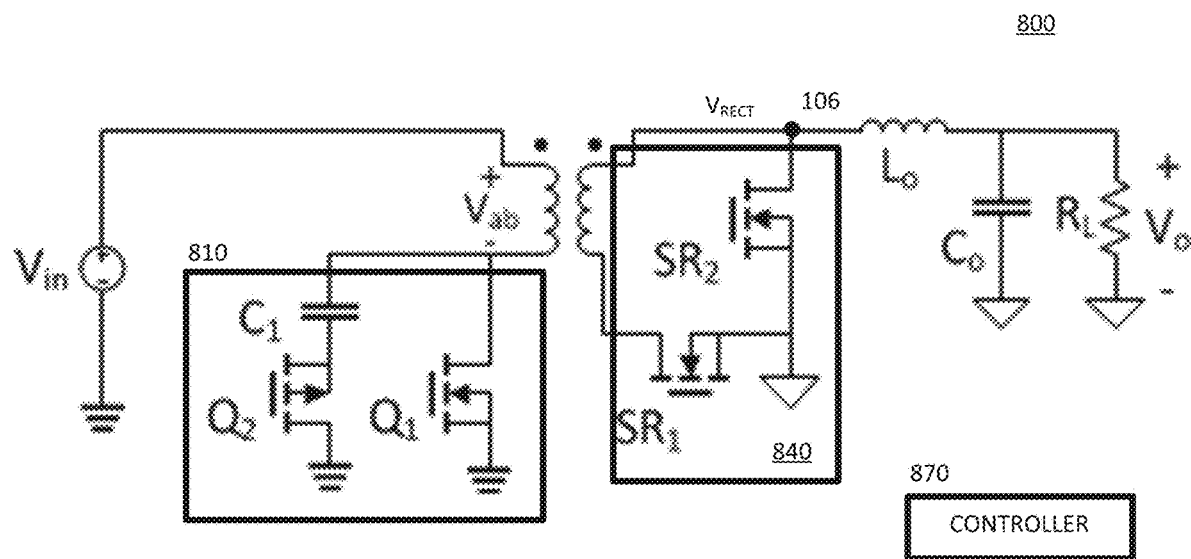
FIG. 8 illustrates a circuit diagram of an isolated switched-mode power converter having an active clamp forward (ACF) topology and half-wave rectifier, and in which feedforward compensation based upon a rectified voltage may be used.

FIG. 8 illustrates an isolated switched-mode power converter 800 based upon an active clamp forward (ACF) topology. Unlike the power stage 110 of FIG. 1, the power stage 810 includes two power switches $Q_1$, $Q_2$ and a capacitor for coupling the input voltage $V_{IN}$ to the transformer. Also different from the power converter of FIG. 1, the transformer secondary has only two terminals and the rectifier 840 coupled to the secondary winding is a half-wave rectifier. Due to the half-wave rectification, the active pulses at the rectified voltage node 106 have a maximum duty cycle of 50%. A controller 870 senses the rectified voltage $V_{RECT}$ and generates switch control signals.

Figure 9:
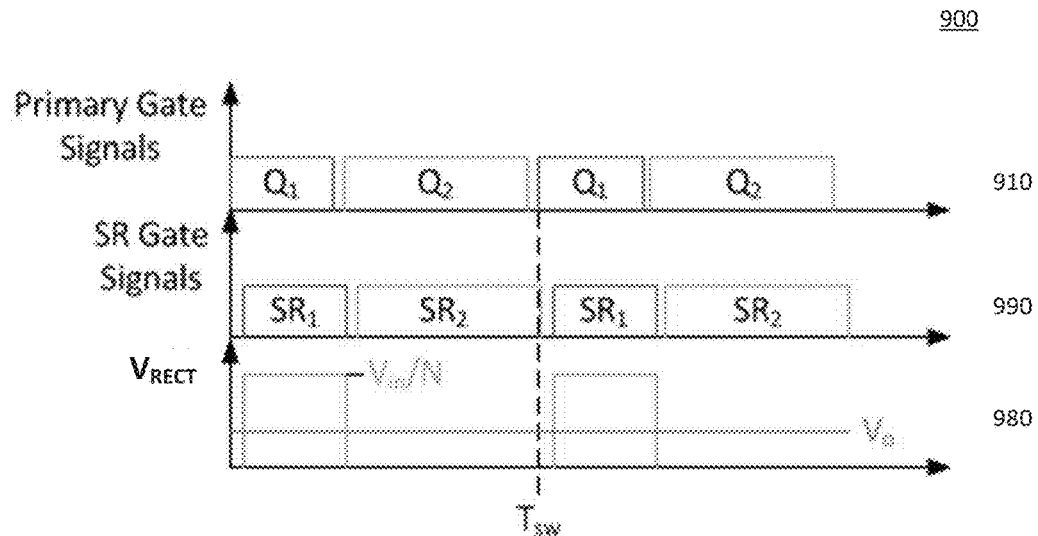
FIG. 9 illustrates waveforms corresponding to voltages and control signals in the power converter of FIG. 8.

FIG. 9 illustrates waveforms 900 corresponding to the ACF power converter 800 of FIG. 8. These waveforms 900 include switch control signals 910 for coupling, via drivers and isolators that are not shown for ease of illustration, to gates of the power switches $Q_1$, $Q_2$. Also shown are waveforms 990 corresponding to switch control signals for the synchronous rectification switches SR1, SR2 that are part of the half-wave rectifier 840. Further shown is a waveform 980 corresponding to the rectified voltage $V_{RECT}$ at the rectified voltage node 106. The feedforward compensation techniques sense the rectified voltage $V_{RECT}$ and generate feedforward compensation parameters, e.g., $d_{FF}$, based upon this sensed voltage. For example, if the controller 870 sensing of the rectified voltage $V_{RECT}$ indicates that the input voltage $V_{IN}$ has decreased below an expected or desired value, the controller 870 increases the duty cycle of the switch control signal for $Q_1$ (and decreases the duty cycle of the switch control signal for $Q_2$) for a next switching cycle, so as to increase the interval for the next active pulse of $V_{RECT}$. The increased width of the next active pulse of $V_{RECT}$ compensates for the reduced $V_{RECT}$ voltage, thereby maintaining a relatively constant power throughput.

The power converter 800 of FIG. 8 can only transfer power during, at most, half of a switching cycle. As compared with power converters that do not use half-wave rectifiers, this leads to increased ripple in the output voltage $V_O$ or the need for more filtering, e.g., a larger output capacitor $C_o$. These problems may be overcome by interleaving ACF topologies.

Figure 10:
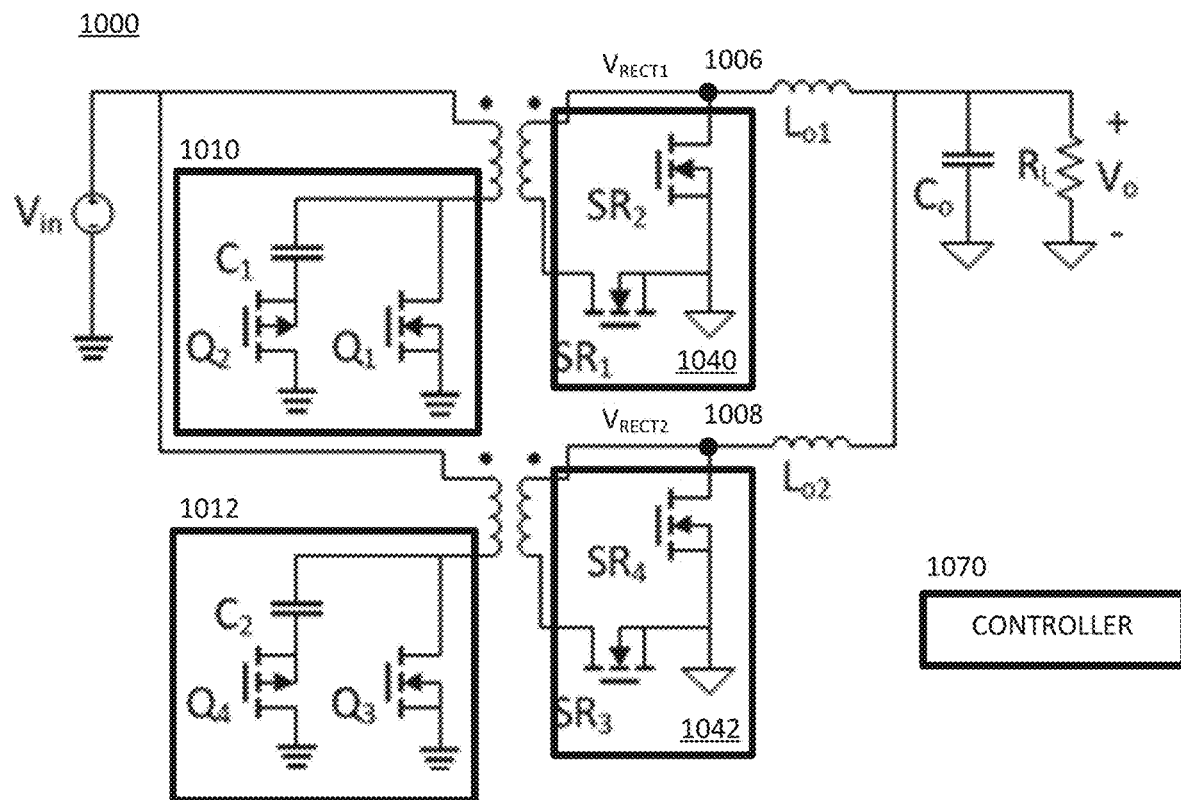
FIG. 10 illustrates a circuit diagram of an isolated switched-mode power converter having interleaved ACF power stages and half-wave rectifiers, and in which feedforward compensation based upon a rectified voltage may be used.
Figure 11:
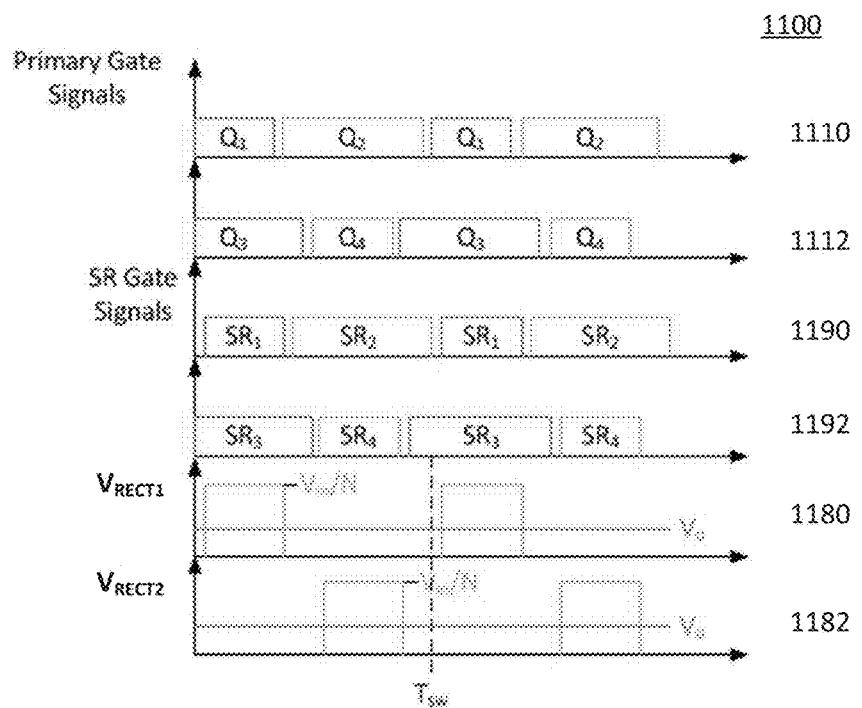
FIG. 11 illustrates waveforms corresponding to voltages and control signals in the power converter of FIG. 10.

FIG. 10 illustrates a power converter 1000 that uses interleaved ACF topologies. The power converter 1000 uses two power stages 1010, 1012 to couple power from the input power source having voltage $V_{IN}$ to two isolation transformers. The secondary windings of the transformers are each coupled to a half-wave rectifier 1040, 1042. As illustrated in FIG. 11, the primary-side power switch control signals 1110, 1112 and the rectification switch control signals 1190, 1192 are interleaved such that rectified voltage $V_{RECT1}$, $V_{RECT2}$ waveforms 1180, 1182 are interleaved. A controller 1070 senses the rectified voltages $V_{RECT1}$, $V_{RECT2}$ at the rectified voltage nodes 1006, 1008 and uses these sensed voltages to provide feedforward compensation to the primary-side switch control signals. The rectified voltages $V_{RECT1}$, $V_{RECT2}$ may be combined, e.g., averaged, summed, before being used by the feedforward compensation, or may each be provided to a separate feedforward compensators within the controller 1070.

Figure 12:
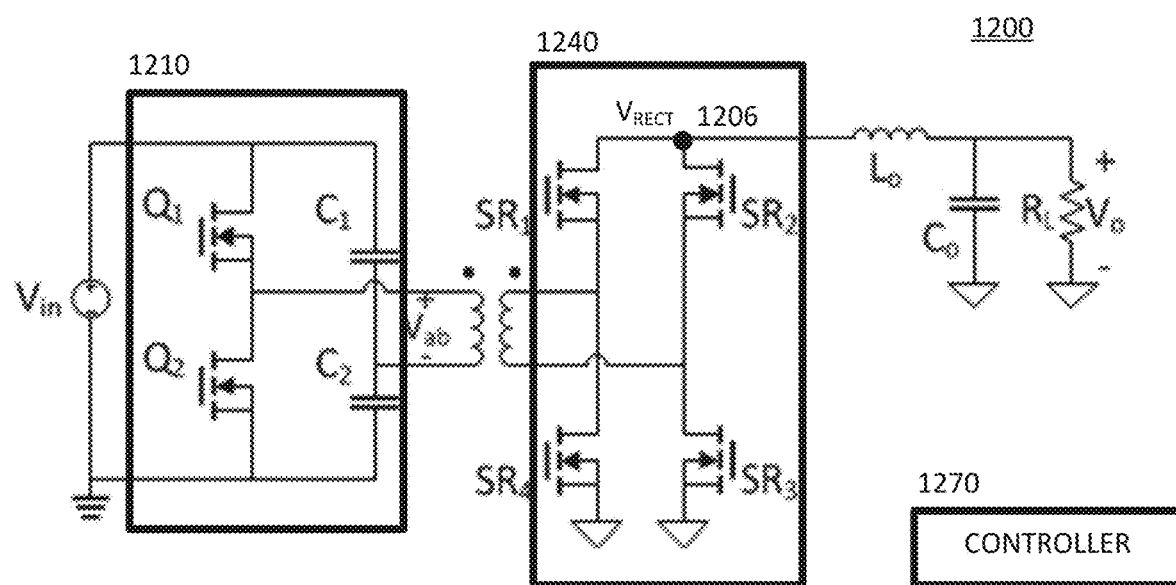
FIG. 12 illustrates a circuit diagram of an isolated switched-mode power converter having a half-bridge power stage and a full-wave rectifier, and in which feedforward compensation based upon a rectified voltage may be used.
Figure 13:
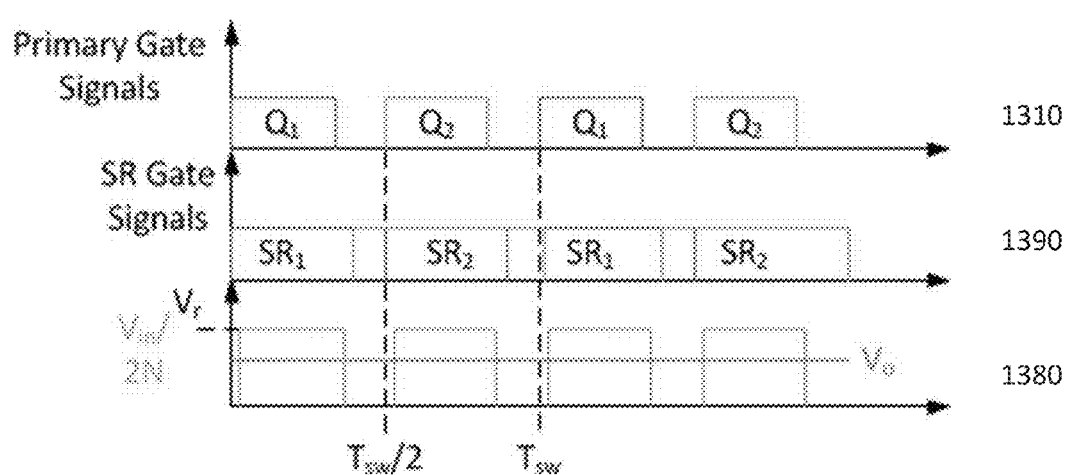
FIG. 13 illustrates waveforms corresponding to voltages and control signals in the power converter of FIG. 12.

FIG. 12 illustrates a power converter 1200 employing a half-bridge power stage 1210 on the primary side and a full-wave rectifier 1240 on the secondary side. The transformer includes a (non-tapped) secondary winding, and four switches SR1, SR2, SR3, SR4 are used to rectify the voltage of the secondary winding. FIG. 13 illustrates waveforms 1300 corresponding to control signals 1310 for the primary-side switches $Q_1$, $Q_2$, corresponding to rectification switch control signals 1390, and corresponding to a rectified voltage $V_{RECT}$ 1380 at the rectified voltage node 1206. As in the previously-described topologies, the rectified voltage $V_{RECT}$ is sensed by a controller 1270 and used to provide feedforward compensation by adjusting control signals, e.g., duty cycles, for the primary-side power switches.

Figure 14:
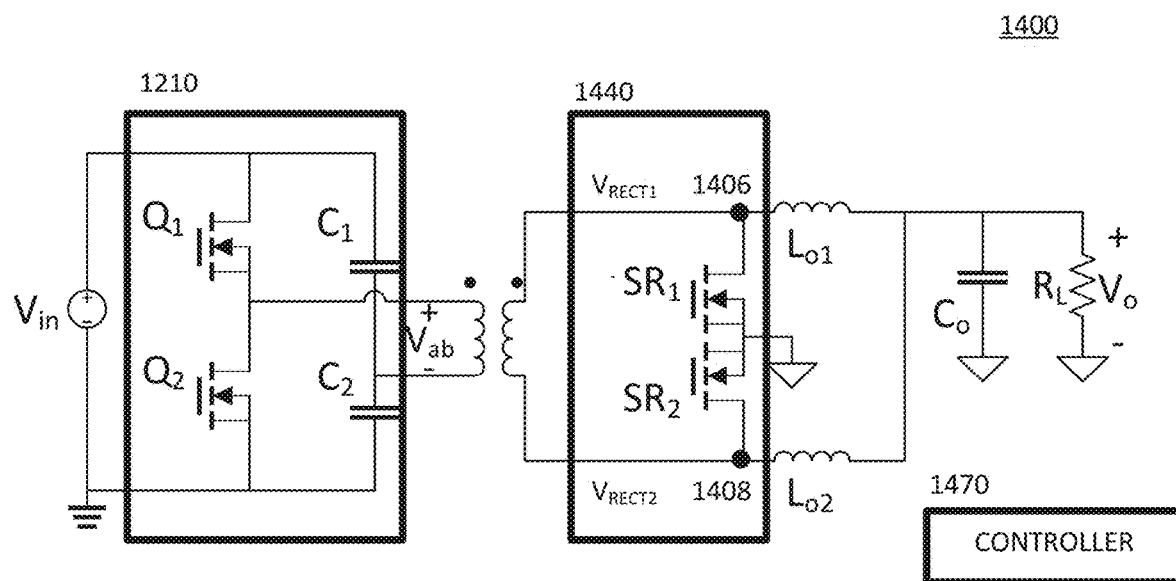
FIG. 14 illustrates a circuit diagram of an isolated switched-mode power converter having a half-bridge power stage and a current-doubler rectifier, and in which feedforward compensation based upon a rectified voltage may be used.

FIG. 14 illustrates a power converter 1400 which also uses a half-bridge power stage 1210 on its primary side, but which includes a current doubler rectifier 1440 on its secondary side. The current doubler rectifier 1440 is coupled across a secondary winding of the transformer, and comprises rectification switches SR1, SR2. These switches SR1, SR2 alternate between coupling a first and a second terminal of the secondary winding to ground, thereby providing two rectified voltage nodes 1406, 1408. Voltages $V_{RECT1}$, $V_{RECT2}$ at these nodes 1406, 1408 are filtered using output inductors $L_{O1}$, $L_{O2}$ and the output capacitor $C_O$. Relative to other rectification circuits, a current doubler rectifier provides a doubled current and a halved voltage at its outputs.

Figure 15:
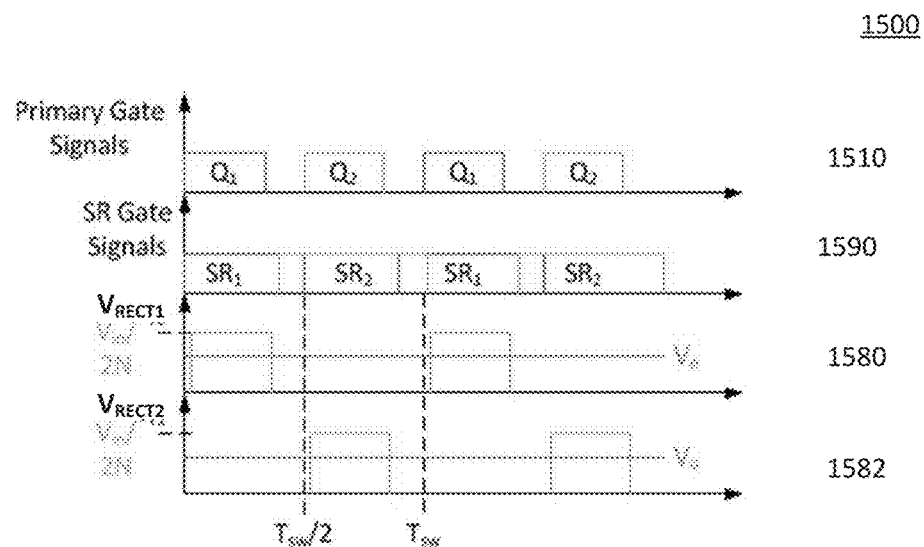
FIG. 15 illustrates waveforms corresponding to voltages and control signals in the power converter of FIG. 14.

FIG. 15 illustrates waveforms 1500 corresponding to control signals 1510 for the primary-side switches $Q_1$, $Q_2$ and waveforms corresponding to control signals 1590 for the rectification switches SR1, SR2. Further illustrated are waveforms 1580, 1582 corresponding to rectified voltages $V_{RECT1}$, $V_{RECT2}$ at the rectified voltage nodes 1406, 1408. A controller 1470 senses the rectified voltages $V_{RECT1}$, $V_{RECT2}$ and uses the above-described feedforward compensation techniques to generate or adjust the switch control signals.

Figure 16:
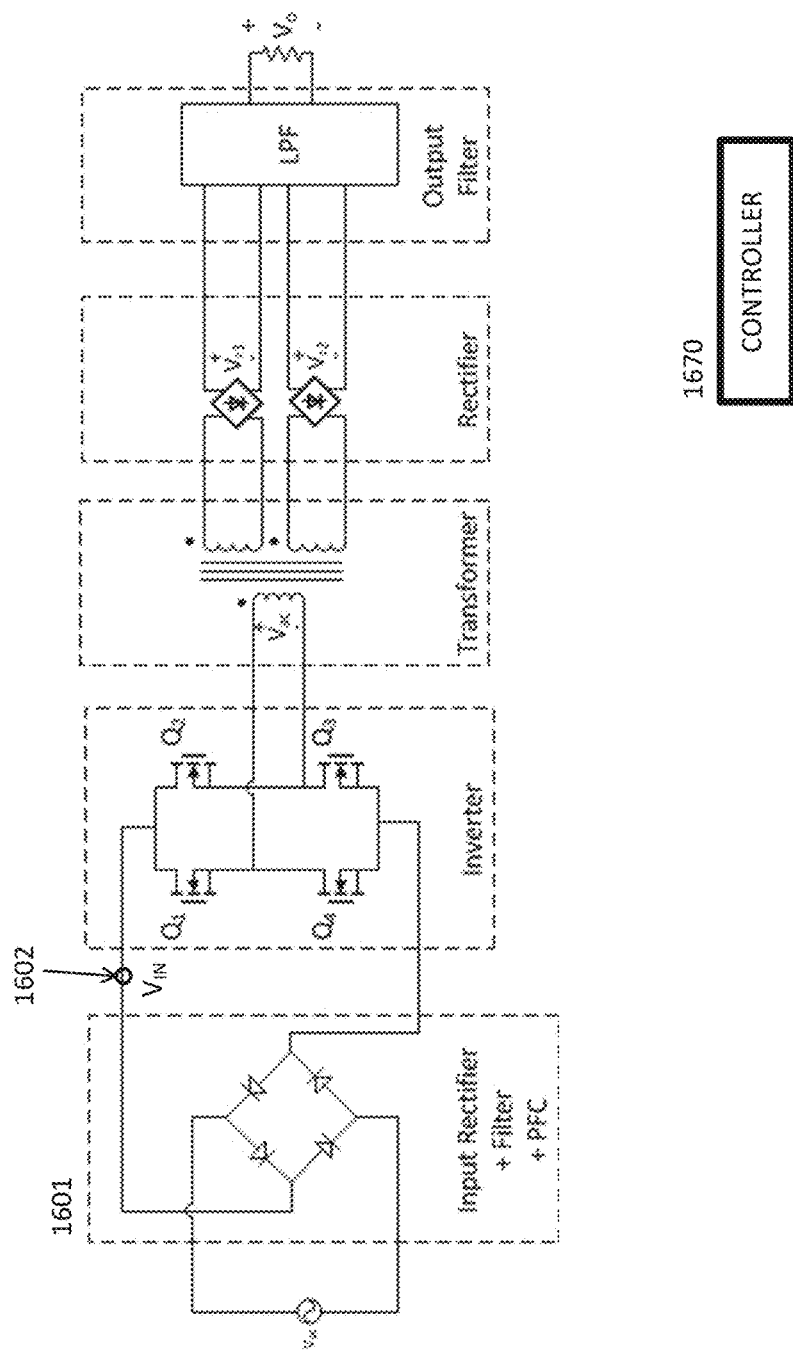
FIG. 16 illustrates a circuit diagram of an isolated switched-mode power converter that is part of an AC-DC converter, and in which feedforward compensation based upon a rectified voltage may be used.

FIG. 16 illustrates an isolated AC-DC switched-mode power converter 1600. This power converter 1600 differs from those described previously in that an AC power source $V_{AC}$ provides AC power to an input rectifier 1601 which, in turn, supplies a DC input voltage $V_{IN}$ at an input 1602. While not illustrated, the input rectifier 1601 may additionally include power factor correction (PFC) circuitry and/or filtering. The input voltage $V_{IN}$ is supplied to an isolated DC-DC switched-mode power converter which may use various primary-side and secondary-side circuit topologies, including those described above. A secondary-side controller 1670 senses a first rectified voltage $V_{r1}$ and, for some topologies, a second rectified voltage $V_{r2}$, and uses this voltage or these voltages to generate switch control signals for the inverter, using feedforward techniques as described above.

According to a first embodiment of a first switched-mode power converter having an isolated topology, the power converter converts power from an input source into power for an output load. The power converter comprises a power stage, a transformer, a rectifier circuit, a filter circuit, and a secondary-side controller. The power stage is coupled to the input source and includes one or more power switches for controlling a power transfer through the power converter. The transformer provides isolation between primary and secondary sides of the power converter, and includes a primary winding which is coupled to the power stage and a secondary winding. The rectifier circuit is coupled to the secondary winding and is configured to provide a first rectified voltage at a first rectified voltage node. The filter circuit is interposed between the first rectified voltage node and an output of the power converter. The filter circuit is configured to filter the first rectified voltage, so as to provide a filtered voltage at the output. The secondary-side controller is configured to receive or generate a reference voltage which provides a regulation target for the output voltage. The secondary-side controller is also configured to sense the output voltage and the first rectified voltage. The secondary-side controller is further configured to generate control signals for controlling the power switches, wherein the generation is based upon the reference voltage, the sensed voltage and the sensed first rectified voltage.

According to a second embodiment of a second switched-mode power converter having an isolated topology, the power converter converts power from an input source into power for an output load. The power converter comprises a power stage, a transformer, a rectifier circuit, and a filter circuit as described above in the first embodiment. The power converter includes a secondary-side controller configured to sense the first rectified voltage and to generate switch control signals for controlling the power switches of the power stage, based upon the sensed first rectified voltage.

According to any embodiment of the first or second power converters, the first rectified voltage is a pulse waveform that is synchronous to the generated switch control signals, and the sensing of the first rectified voltage comprises sensing a voltage amplitude and a transition timing of the first rectified voltage.

According to any embodiment of the first or second power converters, the secondary-side controller is further configured to generate a feedback error signal based upon the sensed output voltage and the reference voltage, generate a feedforward signal based on the sensed first rectified voltage, and generate the switch control signals based upon the feedback and the feedforward signals.

According to any embodiment of the first or second power converters, the secondary-side controller is further configured to sense the first rectified voltage based upon one or more digital samples during a pulse of the first rectified voltage occurring during a present half cycle of the switched-mode power converter, and to use the sensed first rectified voltage of the present half cycle to generate feedforward signals for a subsequent half cycle of the power converter.

According to any embodiment of the first or second power converters, the secondary-side controller is configured to estimate an input voltage of the input source based upon the sensed first rectified voltage.

According to any embodiment of the first or second power converters, the controller is further configured to detect that a change in the sensed first rectified voltage is above a voltage change threshold, and, responsive to this detection, to alter an operational mode of the controller for one or more cycles of the switched-mode power converter. According to a sub-embodiment, the altering of the operational mode is from a fixed-frequency pulse-width-modulation (PWM) mode to an operational mode having a variable frequency. According to another sub-embodiment, the altering of the operational mode is from a linear operational mode to a non-linear operational mode.

According to any embodiment of the first or second power converters, the one or more power switches of the power stage are arranged in a full-bridge topology.

According to any embodiment of the first or second power converters, the switched-mode power converter has a primary-side topology that is one of a flyback topology, a half-bridge topology, and an active clamp forward topology.

According to any embodiment of the first or second power converters, the secondary winding is a center-tapped secondary winding and the one or more rectified voltage nodes comprise a center tap of the center-tapped secondary winding.

According to any embodiment of the first or second power converters, the rectifier circuit comprises two current-blocking devices and is configured as a current doubler, the first voltage node comprises a first terminal of the secondary winding, the rectifier circuit further includes a second rectified voltage node which comprises a second terminal of the secondary winding, and the filter circuit comprises a first inductor coupled to the first terminal and a second inductor coupled to the second terminal.

According to any embodiment of the first or second power converters, the rectifier circuit comprises four rectification switches configured as a full-wave rectifier, the first rectified voltage node comprises an output rectification terminal of the rectifier circuit, the filter circuit comprises an inductor coupled to the output rectification terminal.

According to an embodiment of a method, the method is performed within an isolated switched-mode power converter for converting power from an input source into power for an output load. The power converter comprises a power stage including one or more switches, a transformer comprising a primary winding coupled to the power stage and a secondary winding, a rectifier circuit coupled to the secondary winding and configured to provide a first rectified voltage at a first rectified voltage node, and a filter circuit interposed between the first rectified voltage node and an output of the switched-mode power converter. The method comprises a first step of receiving or generating a reference voltage which provides a regulation target for an output voltage at the output of the power converter. The method further comprises steps of sensing the output voltage and the first rectified voltage. The method also includes a step of generating switch control signals for controlling the one or more power switches, wherein the generation is based upon the reference voltage, the sensed output voltage, and the sensed first rectified voltage.

According to any embodiment of the method, the first rectified voltage is a pulse waveform that is synchronous to the generated switch control signals, and the sensing of the first rectified voltage comprises sensing a voltage amplitude and a transition timing of the first rectified voltage.

According to any embodiment of the method, the method further comprises generating a feedback error signal based upon the sensed output voltage and the reference voltage, generating a feedforward signal based on the sensed first rectified voltage and the reference voltage, and generating the switch control signals based upon the feedback and the feedforward signals.

According to any embodiment of the method, the sensing of the first rectified voltage comprises digitally sampling the first rectified voltage during a pulse of the first rectified voltage occurring during a present half cycle of the switched-mode power converter, and the generating of the feedforward signal for a subsequent half cycle of the switched-mode power converter is based upon the sensed first rectified voltage of the present half cycle.

According to any embodiment of the method, the method further comprises estimating an input voltage of the input source based upon the sensed first rectified voltage.

According to any embodiment of the method, the method further comprises detecting that a change in the sensed first rectified voltage is above a voltage change threshold, and altering, responsive to the detection, an operational mode for one or more cycles of the switched-mode power converter. According to a sub-embodiment, the altering of the operational mode is from a fixed-frequency pulse-width-modulation (PWM) mode to an operational mode having a variable frequency. According to another sub-embodiment, the altering of the operational mode is from a linear operational mode to a non-linear operational mode.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switched-mode power converter using an isolated topology for converting power from an input source into power for an output load, the switched-mode power converter comprising:

a power stage coupled to the input source and comprising one or more power switches;

a transformer comprising a primary winding coupled to the power stage, and a secondary winding;

a rectifier circuit coupled to the secondary winding and configured to provide a first rectified voltage at a first rectified voltage node;

a filter circuit interposed between the first rectified voltage node and an output of the switched-mode power converter, and configured to filter the first rectified voltage, thereby providing a filtered voltage at the output; and a secondary-side controller configured to:
sense the first rectified voltage and generate a feedforward signal based on the sensed first rectified voltage;
sense the output voltage and generate a feedback error signal based upon the sensed output voltage and a reference voltage that provides a regulation target for an output voltage at the output;
generate switch control signals for controlling the one or more power switches based upon the feedforward signal and the feedback error signal; and
detect that a change in the sensed first rectified voltage is above a nonzero voltage change threshold and, responsive to this detection, alter an operational mode of the controller for one or more cycles of the switched-mode power converter,
wherein the feedforward signal is generated so as to decrease an interval of energy transfer across the transformer in response to an increase in the sensed first rectified voltage.

2. The switched-mode power converter of claim 1, wherein the first rectified voltage is a pulse waveform that is synchronous to the generated switch control signals, and
wherein the sensing of the first rectified voltage comprises sensing a voltage amplitude and a transition timing of the first rectified voltage.

3. The switched-mode power converter of claim 1, wherein the secondary-side controller is further configured to sense the first rectified voltage based upon one or more digital samples during a pulse of the first rectified voltage occurring during a present half cycle of the switched-mode power converter, and to use the sensed first rectified voltage of the present half cycle to generate feedforward signals for a subsequent half cycle of the switched-mode power converter.

4. The switched-mode power converter of claim 1, wherein the secondary-side controller is configured to estimate an input voltage of the input source based upon the sensed first rectified voltage.

5. The switched-mode power converter of claim 1, wherein the altering of the operational mode is from a fixed-frequency pulse-width-modulation (PWM) mode to an operational mode having a variable frequency.

6. The switched-mode power converter of claim 1, wherein the altering of the operational mode is from a linear operational mode to a non-linear operational mode.

7. The switched-mode power converter of claim 1, wherein the one or more power switches of the power stage are arranged in a full-bridge topology.

8. The switched-mode power converter of claim 1, wherein the switched-mode power converter has a primary-side topology that is one of a flyback topology, a half-bridge topology, and an active clamp forward topology.

9. The switched-mode power converter of claim 1, wherein the secondary winding is a center-tapped secondary winding and the first rectified voltage node comprises a center tap of the center-tapped secondary winding.

10. The switched-mode power converter of claim 1, wherein:
the rectifier circuit comprises two current-blocking devices and is configured as a current doubler,
the first rectified voltage node comprises a first terminal of the secondary winding,
the rectifier circuit further includes a second rectified voltage node which comprises a second terminal of the secondary winding, and
the filter circuit comprises a first inductor coupled to the first terminal and a second inductor coupled to the second terminal.

11. The switched-mode power converter of claim 1, wherein:
the rectifier circuit comprises four rectification switches configured as a full-wave rectifier;
the first rectified voltage node comprises an output rectification terminal of the rectifier circuit;
the filter circuit comprises an inductor coupled to the output rectification terminal.

12. The switched-mode power converter of claim 1, wherein the secondary-side controller is configured such that the feedforward signal is generated so as to increase an interval of energy transfer across the transformer in response to a decrease in the sensed first rectified voltage.

13. The switched-mode power converter of claim 12, wherein the feedforward signal is a feedforward duty cycle, the decrease in the interval of energy transfer corresponds to a decrease in the feedforward duty cycle, and the increase in the interval of energy transfer corresponds to an increase in the feedforward duty cycle.

14. A method within an isolated switched-mode power converter for converting power from an input source into power for an output load, wherein the power converter comprises a power stage including one or more switches, a transformer comprising a primary winding coupled to the power stage and a secondary winding, a rectifier circuit coupled to the secondary winding and configured to provide a first rectified voltage at a first rectified voltage node, and a filter circuit interposed between the first rectified voltage node and an output of the switched-mode power converter, the method comprising:
sensing the first rectified voltage;
generating a feedforward signal based on the sensed first rectified voltage;
sensing the output voltage;
generating a feedback error signal based upon the sensed output voltage and a reference voltage that provides a regulation target for an output voltage at the output;
generating switch control signals for controlling the one or more power switches, the generation based upon the feedforward signal and the feedback error signal;
detecting that a change in the sensed first rectified voltage is above a nonzero voltage change threshold; and
altering, responsive to the detecting, an operational mode for one or more cycles of the switched-mode power converter,
wherein the feedforward signal is generated so as to decrease an interval of energy transfer across the transformer in response to an increase in the sensed first rectified voltage.

15. The method of claim 14, wherein the rectified voltage is a pulse waveform that is synchronous to the generated switch control signals, and wherein the sensing of the first rectified voltage comprises sensing a voltage amplitude and a transition timing of the first rectified voltage.

16. The method of claim 14,
wherein the sensing of the first rectified voltage comprises digitally sampling the first rectified voltage during a pulse of the first rectified voltage occurring during a present half cycle of the switched-mode power converter, and
wherein the generating of the feedforward signal for a subsequent half cycle of the switched-mode power converter is based upon the sensed first rectified voltage of the present half cycle.

17. The method of claim 14, further comprising:
estimating an input voltage of the input source based upon the sensed first rectified voltage.

18. The method of claim 14, wherein the altering of the operational mode is from a fixed-frequency pulse-width-modulation (PWM) mode to an operational mode having a variable frequency.

19. The method of claim 14, wherein the altering of the operational mode is from a linear operational mode to a non-linear operational mode.

20. The method of claim 14, wherein the feedforward signal is generated so as to increase an interval of energy transfer across the transformer in response to a decrease in the sensed first rectified voltage.

21. A switched-mode power converter using an isolated topology for converting power from an input source into power for an output load, the switched-mode power converter comprising:
   a power stage coupled to the input source and comprising one or more power switches;
   a transformer comprising a primary winding coupled to the power stage, and a secondary winding;
   a rectifier circuit coupled to the secondary winding and configured to provide a first rectified voltage at a first rectified voltage node;
   a filter circuit interposed between the first rectified voltage node and an output of the switched-mode power converter, and configured to filter the first rectified voltage, thereby providing a filtered voltage at the output; and
   a secondary-side controller configured to:
      sense a voltage amplitude and a transition timing of the first rectified voltage and generate a feedforward signal based on the voltage amplitude and the transition timing of the first rectified voltage;
      sense the output voltage and generate a feedback error signal based upon the sensed output voltage and a reference voltage that provides a regulation target for an output voltage at the output; and
      generate switch control signals for controlling the one or more power switches based upon the feedforward signal and the feedback error signal,
      wherein the feedforward signal is generated so as to decrease an interval of energy transfer across the transformer in response to an increase in the sensed first rectified voltage, and
      wherein the first rectified voltage is a pulse waveform that is synchronous to the generated switch control signals.

* * * * *